(12) United States Patent
Terada et al.

(10) Patent No.: US 8,284,168 B2
(45) Date of Patent: Oct. 9, 2012

(54) USER INTERFACE DEVICE

(75) Inventors: Tomohiro Terada, Osaka (JP); Atsushi Yamashita, Osaka (JP); Takuya Hirai, Osaka (JP); Nobuyuki Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 532 days.

(21) Appl. No.: 12/519,869

(22) PCT Filed: Dec. 18, 2007

(86) PCT No.: PCT/JP2007/074300
§ 371 (c)(1),
(2), (4) Date: Jun. 18, 2009

(87) PCT Pub. No.: WO2008/078603
PCT Pub. Date: Jul. 3, 2008

(65) Prior Publication Data
US 2009/0309848 A1    Dec. 17, 2009

(30) Foreign Application Priority Data

Dec. 22, 2006  (JP) ................................. 2006-345520

(51) Int. Cl.
*G06F 3/041* (2006.01)

(52) U.S. Cl. ........ 345/173; 715/702; 715/810; 345/158; 345/172

(58) Field of Classification Search .................. 345/168, 345/173, 157, 158, 163, 172; 358/108, 93; 340/709, 706; 715/702, 810
See application file for complete search history.

(56) References Cited

U.S. PATENT DOCUMENTS

| 4,928,170 | A | * | 5/1990 | Soloveychik et al. | .......... 348/63 |
| 5,767,842 | A | * | 6/1998 | Korth | ........................... 345/168 |
| 5,835,079 | A | * | 11/1998 | Shieh | ........................... 345/173 |
| 2008/0163131 | A1 | | 7/2008 | Hirai et al. | |

FOREIGN PATENT DOCUMENTS

| JP | 10-269012 | 10/1998 |
| JP | 2003-300444 | 10/2003 |
| JP | 2005-254851 | 9/2005 |
| WO | 2006/027924 | 3/2006 |
| WO | 2006/104132 | 10/2006 |

* cited by examiner

OTHER PUBLICATIONS

International Search Report mailed Feb. 5, 2008 for International Application No. PCT/JP2007/074300.

*Primary Examiner* — Lun-Yi Lao
*Assistant Examiner* — Shaheda Abdin
(74) *Attorney, Agent, or Firm* — Wenderoth, Lind & Ponack, L.L.P.

(57) ABSTRACT

A user interface device allocates each of functions for operating an instrument to fingertips in response to a hand movement and allowing an operator to intuitively comprehend the allocation of each of the functions to the fingertips. The device includes a GUI button allocation section that first allocates a GUI button, read out from a GUI button data storing section, to each fingertip in a hand shape acquired by a hand shape acquiring section when a contact position acquiring section detects a contact to an operation surface by the operator. Then, in accordance with a change of hand shape direction, the GUI button allocation section reallocates the GUI button to each fingertip of the hand shape. The device also includes a superimposed image creating section that creates a composite image of an image of a GUI button allocated by the GUI button allocation section and an image of the hand shape, and a displaying section that displays the composite image of the image of the GUI button and the image of the hand shape created by the superimposed image creating section.

3 Claims, 22 Drawing Sheets

[FIG.1]
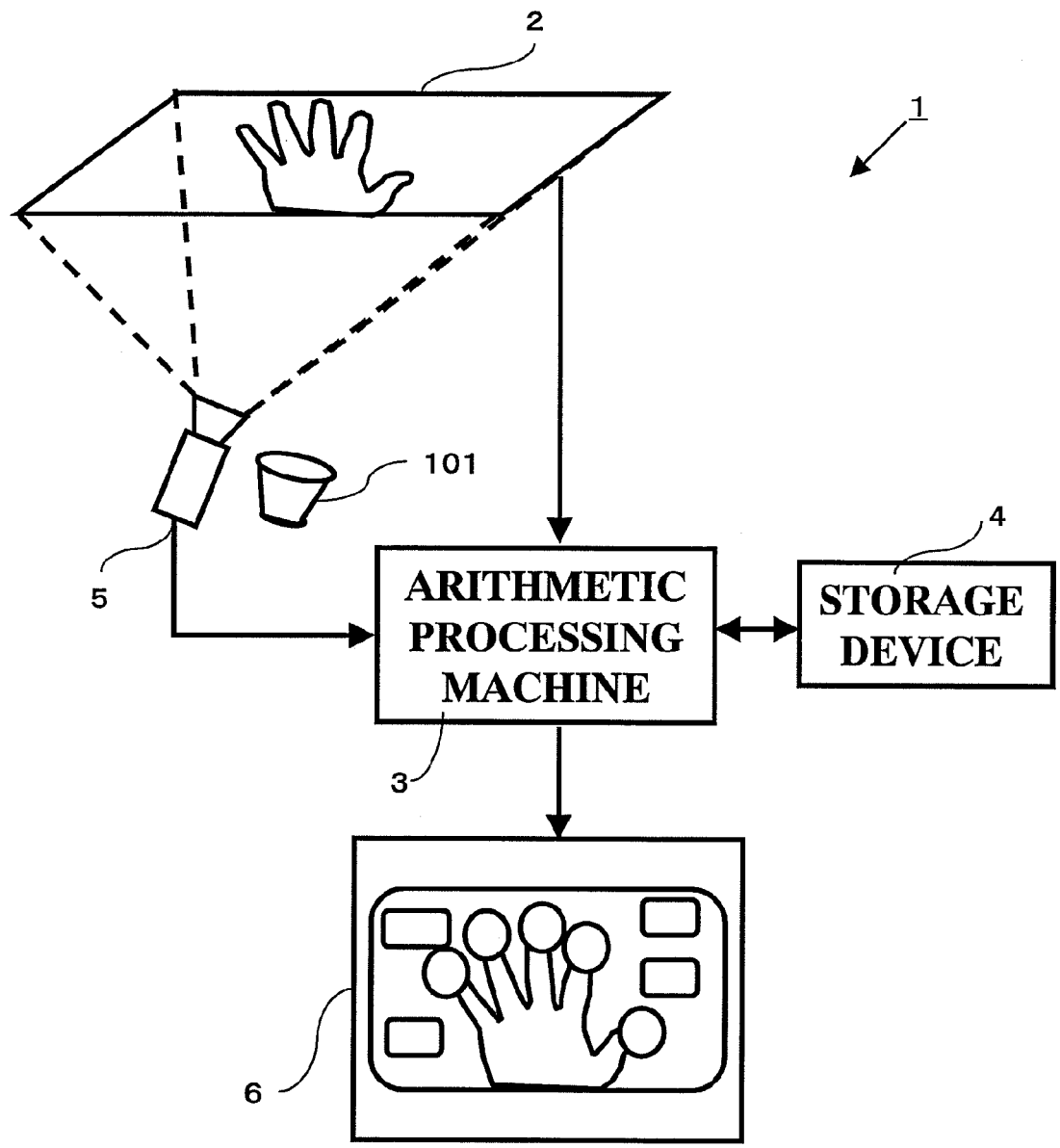

[FIG.2]
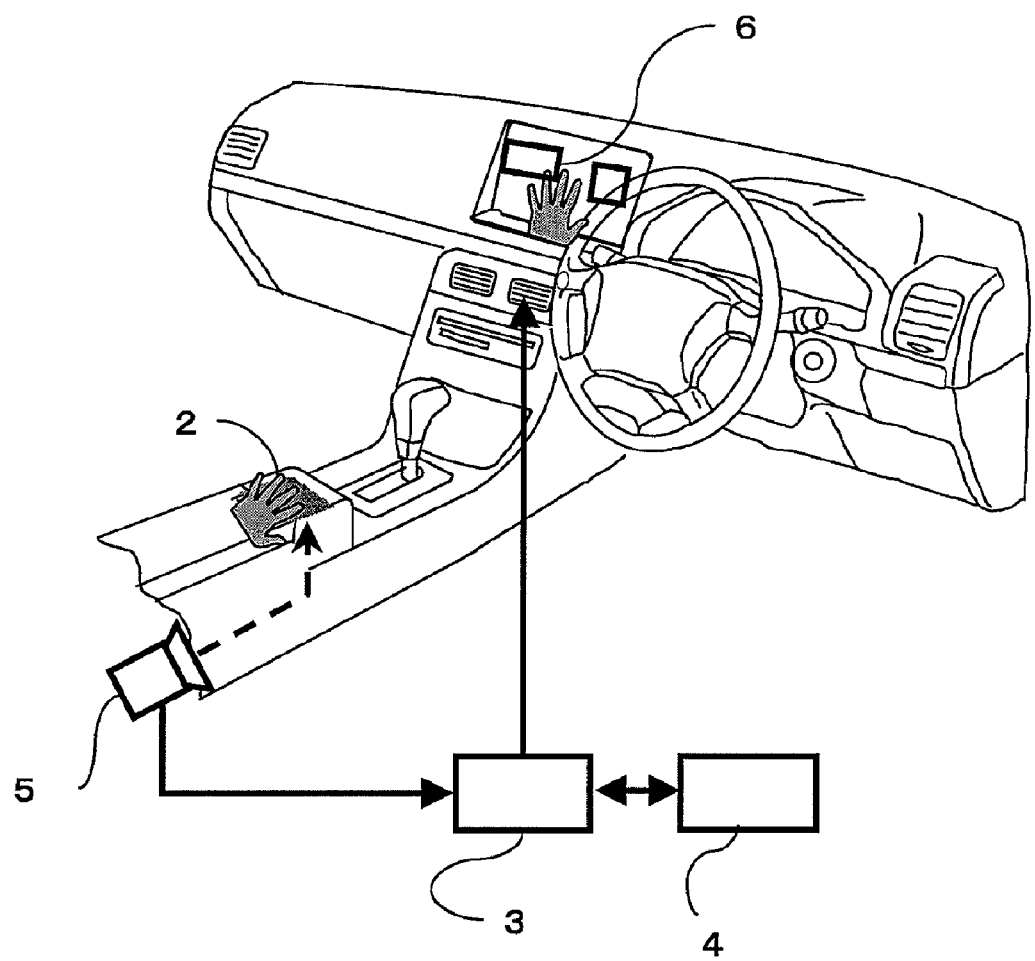

[FIG.3]
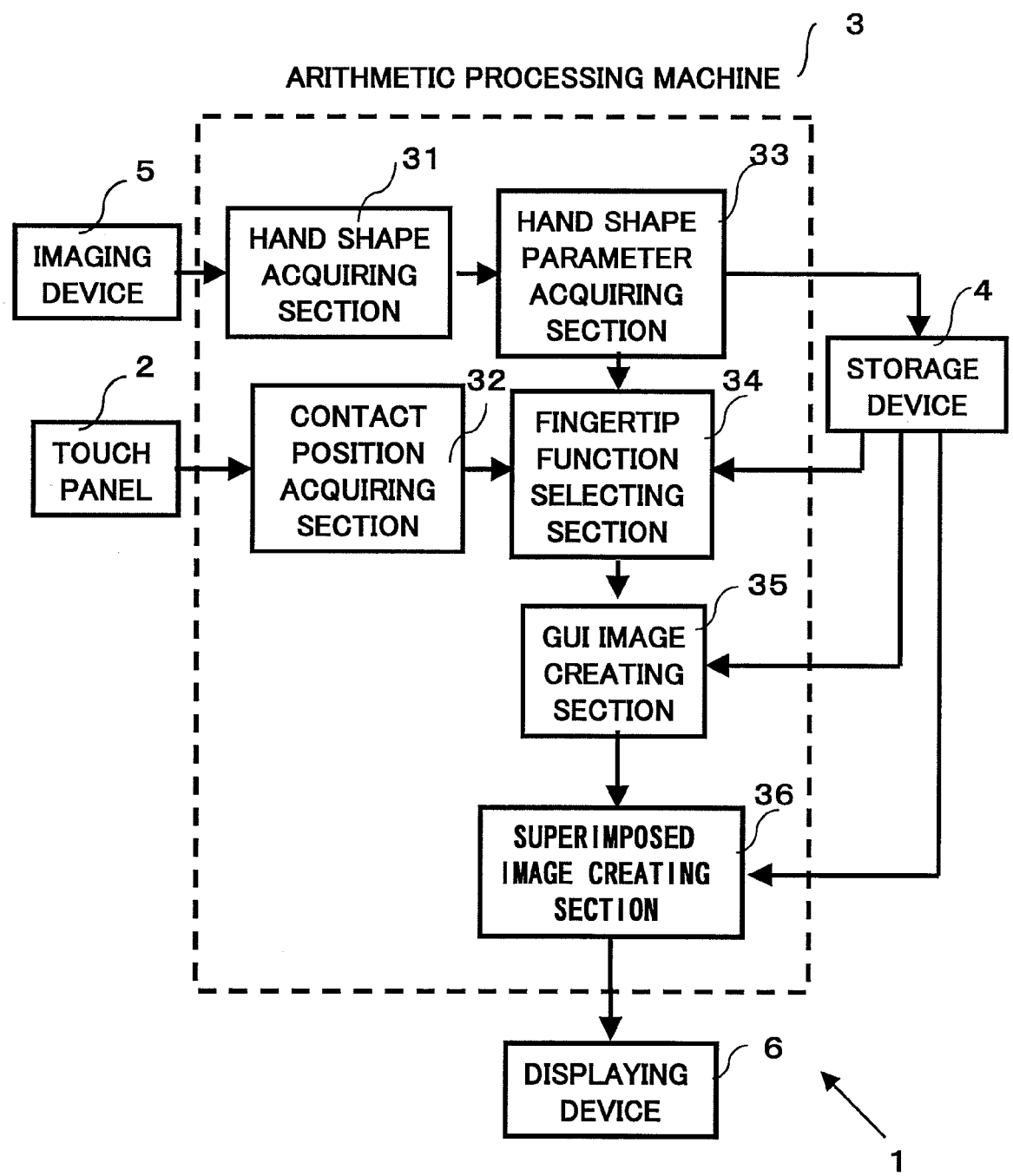

[FIG.4]
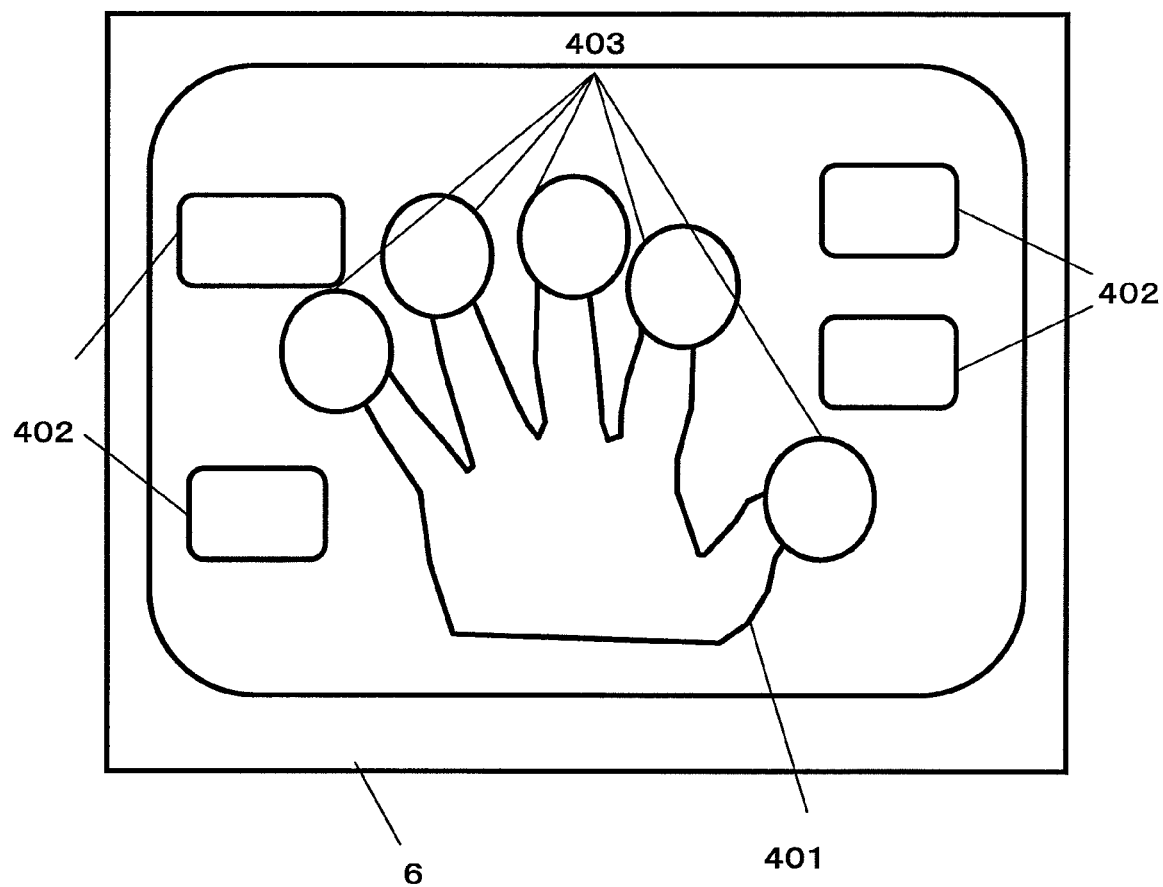

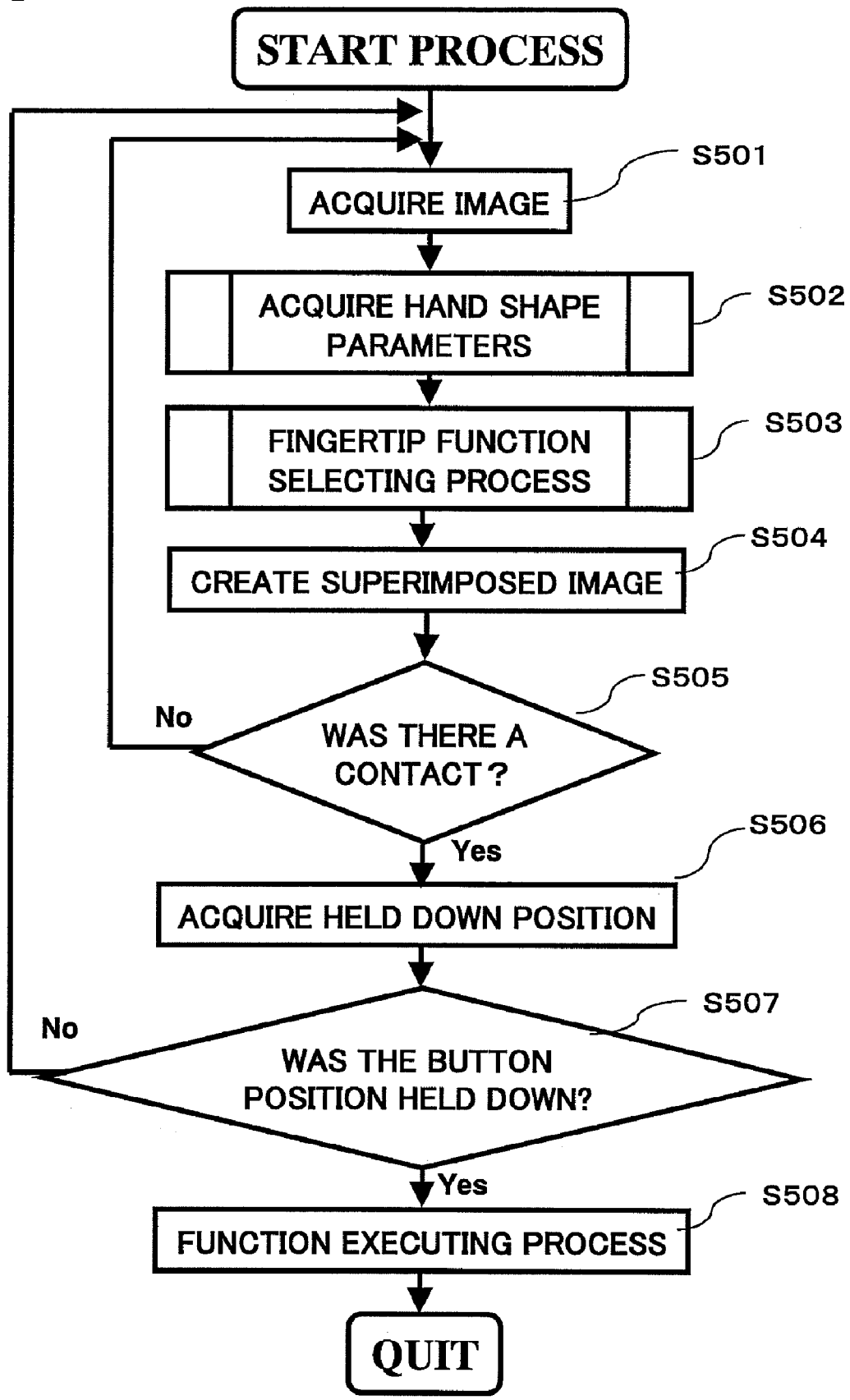
[FIG.5]

[FIG.6]
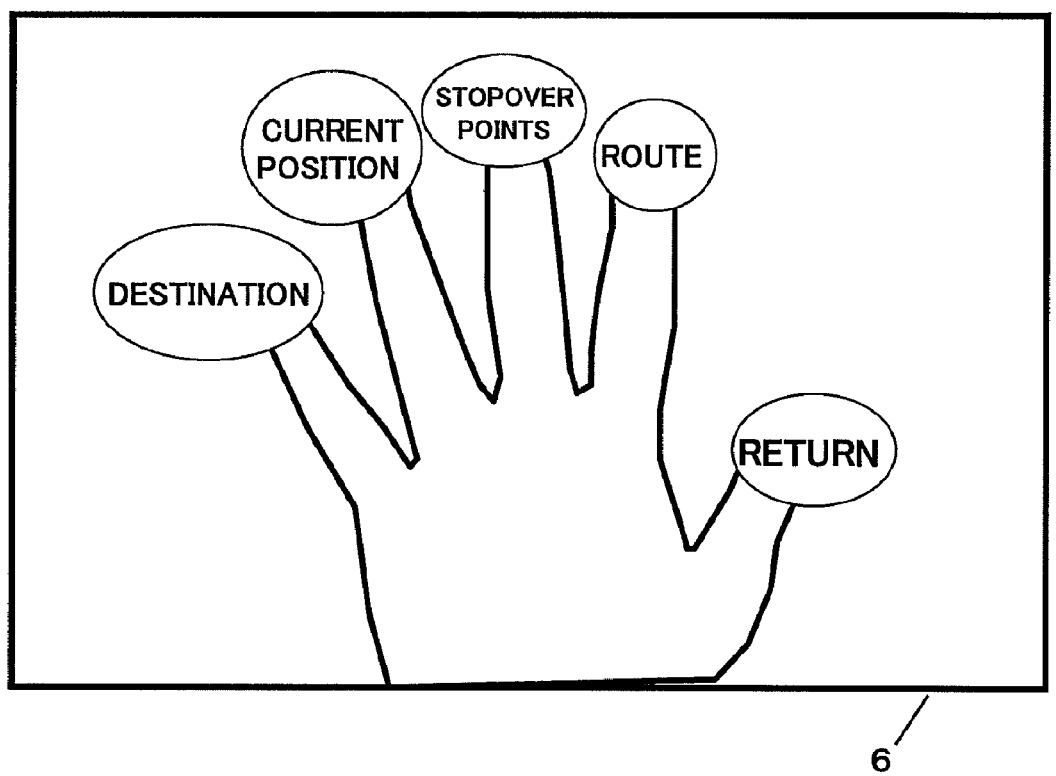

[FIG. 7]
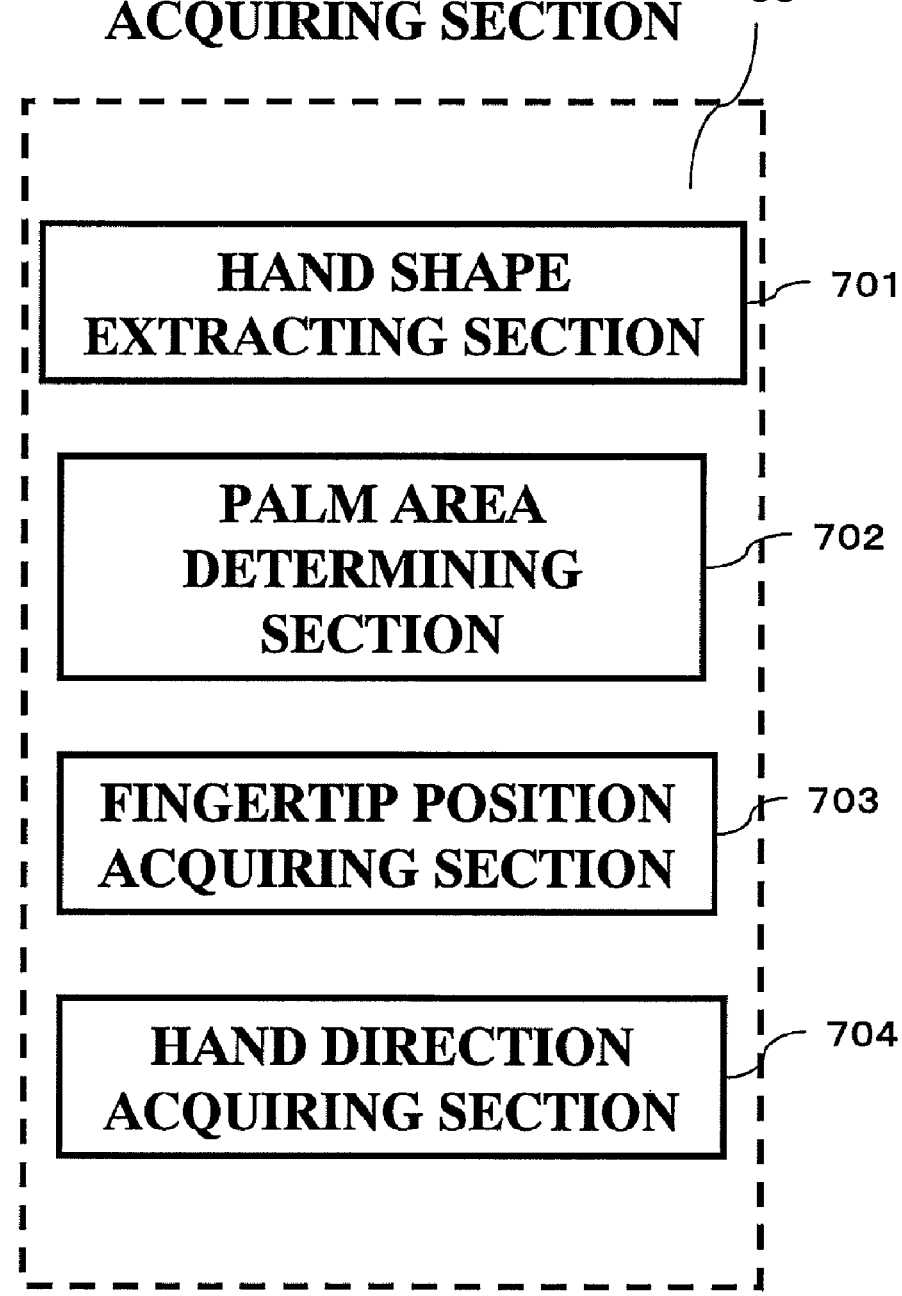

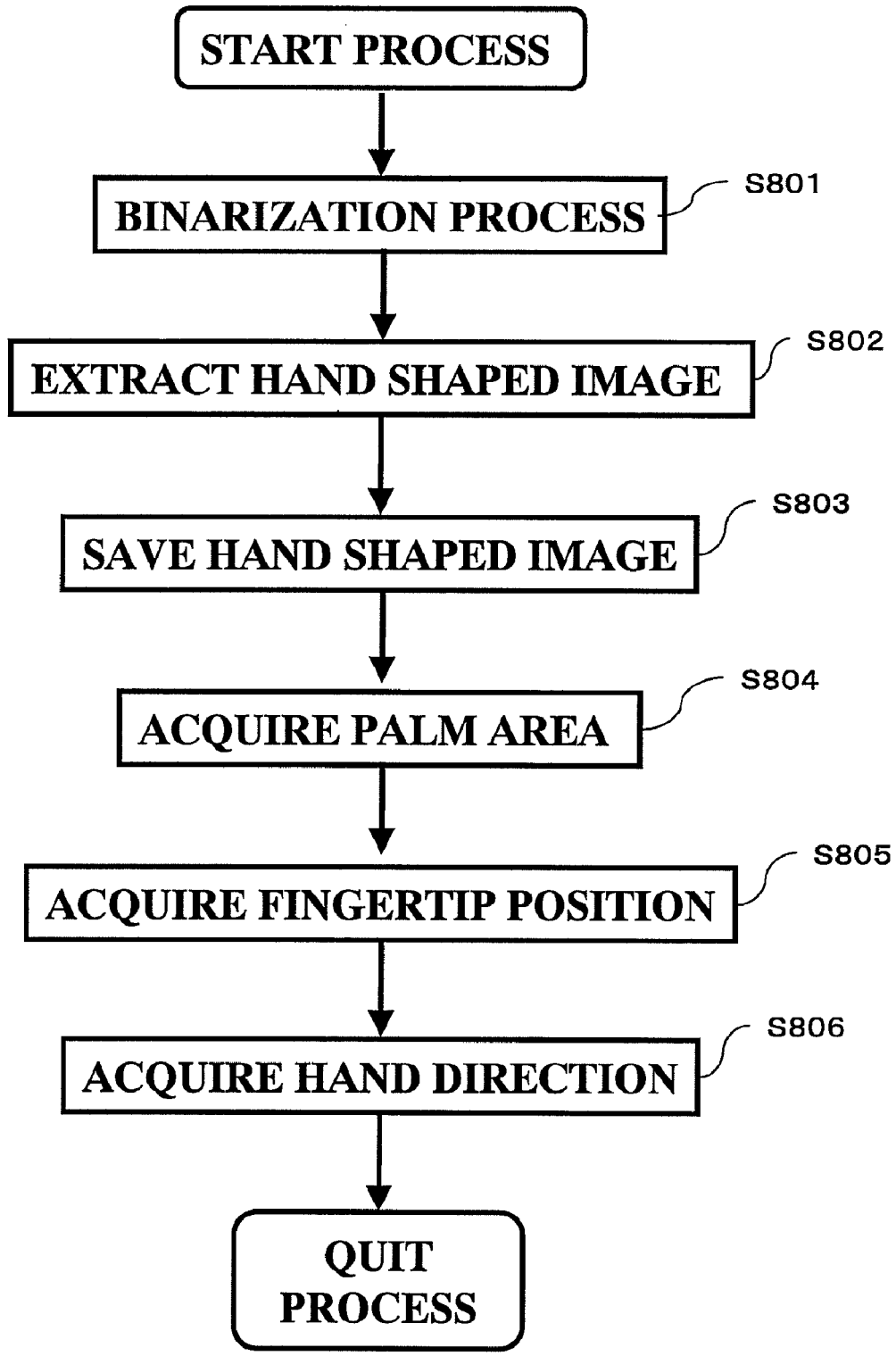
[FIG.8]

[FIG.9]
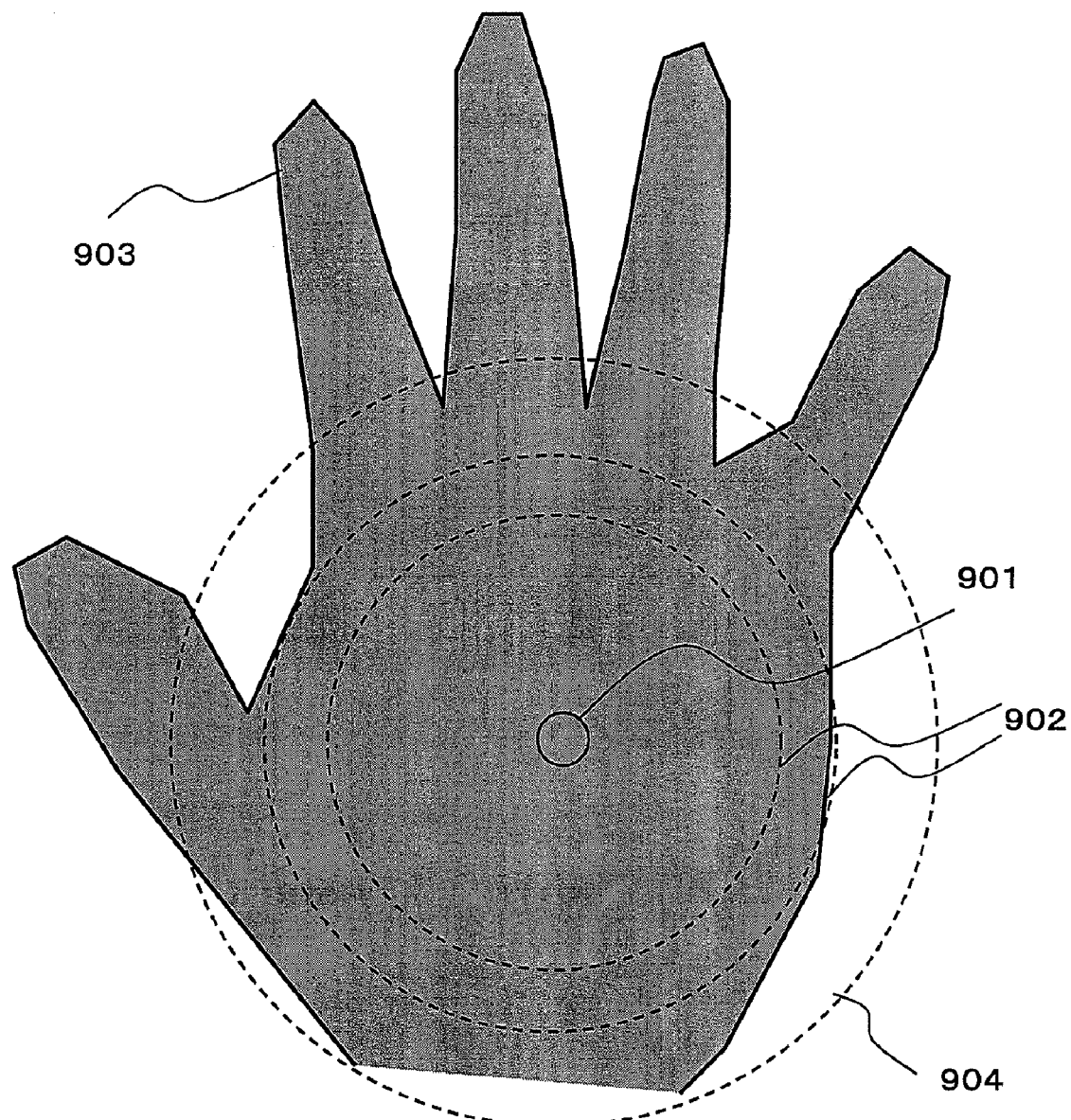

[FIG.10]
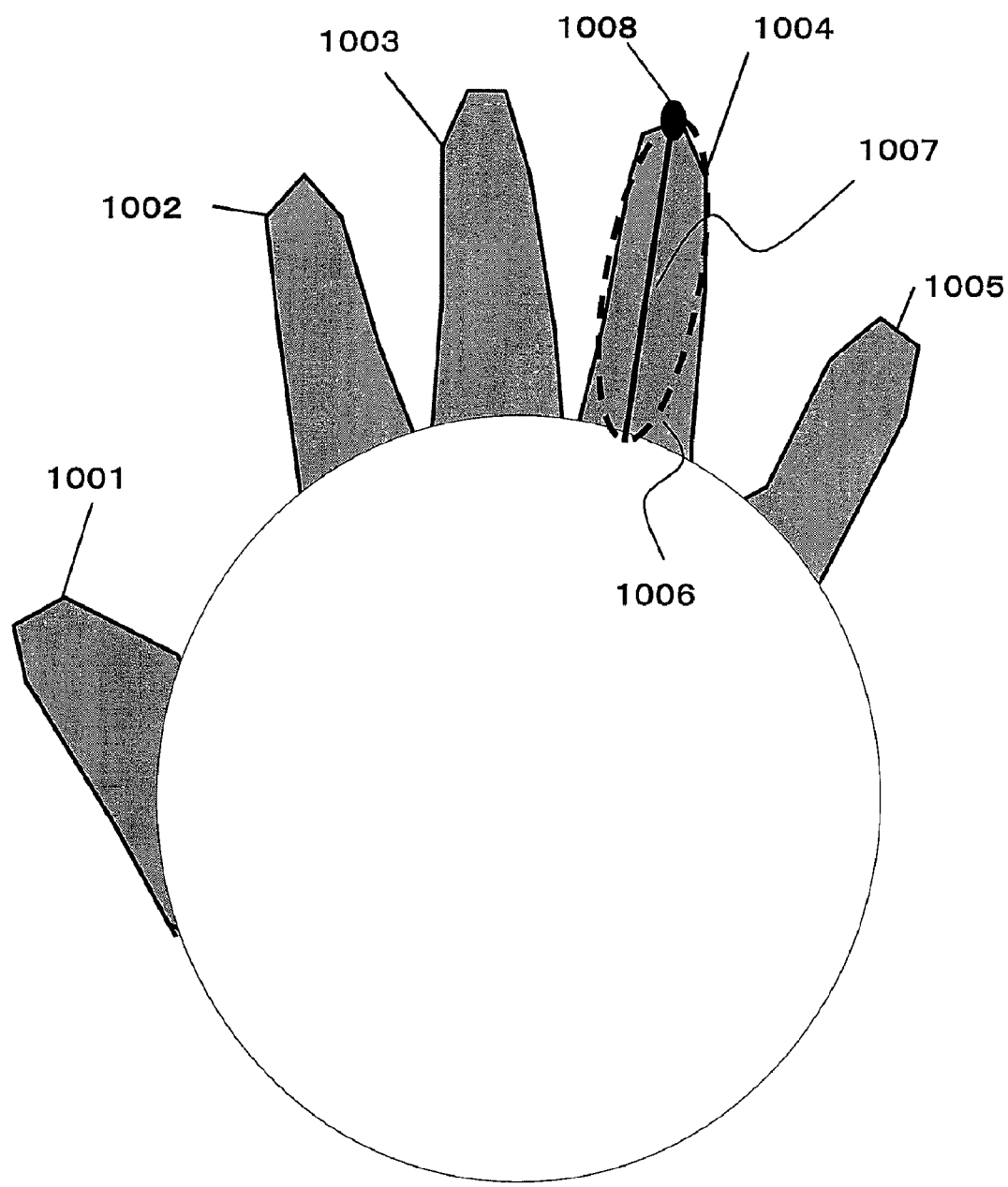

[FIG.11]
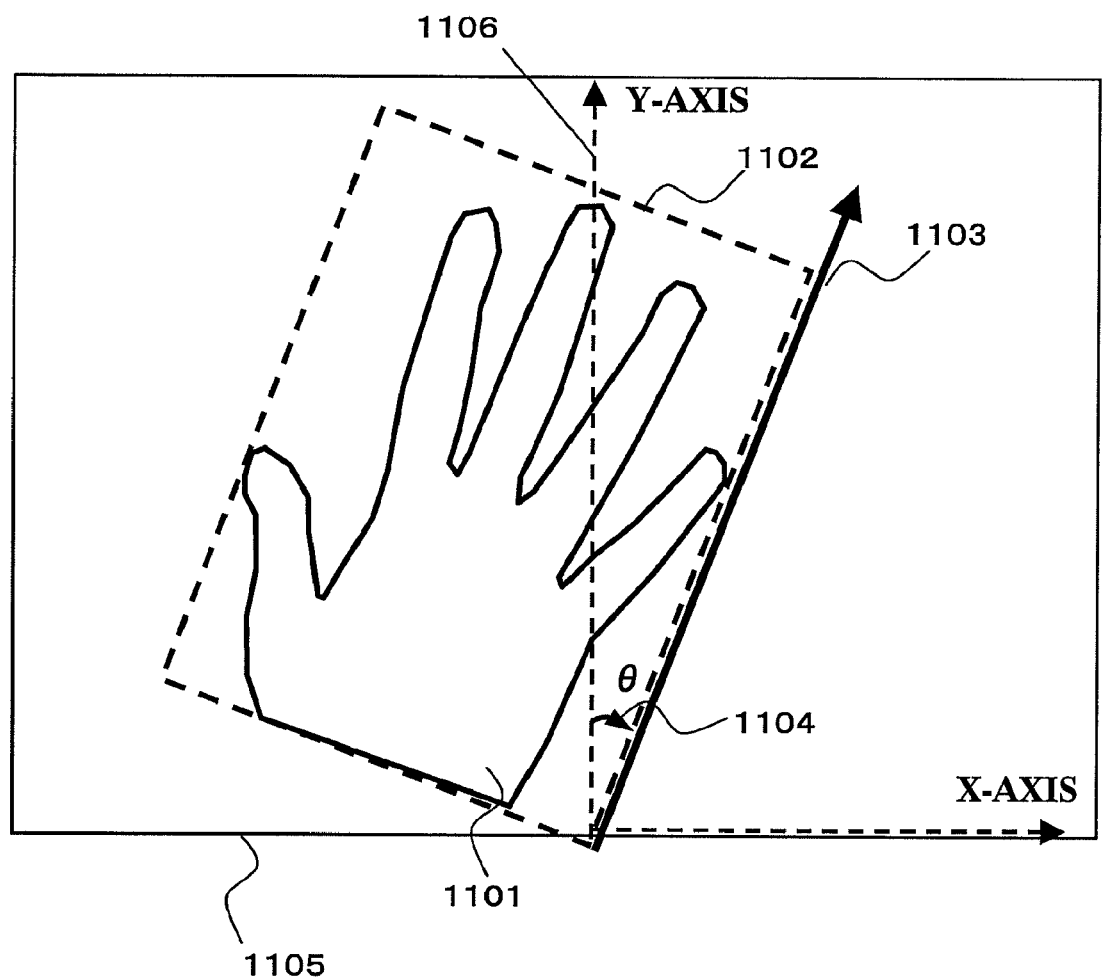

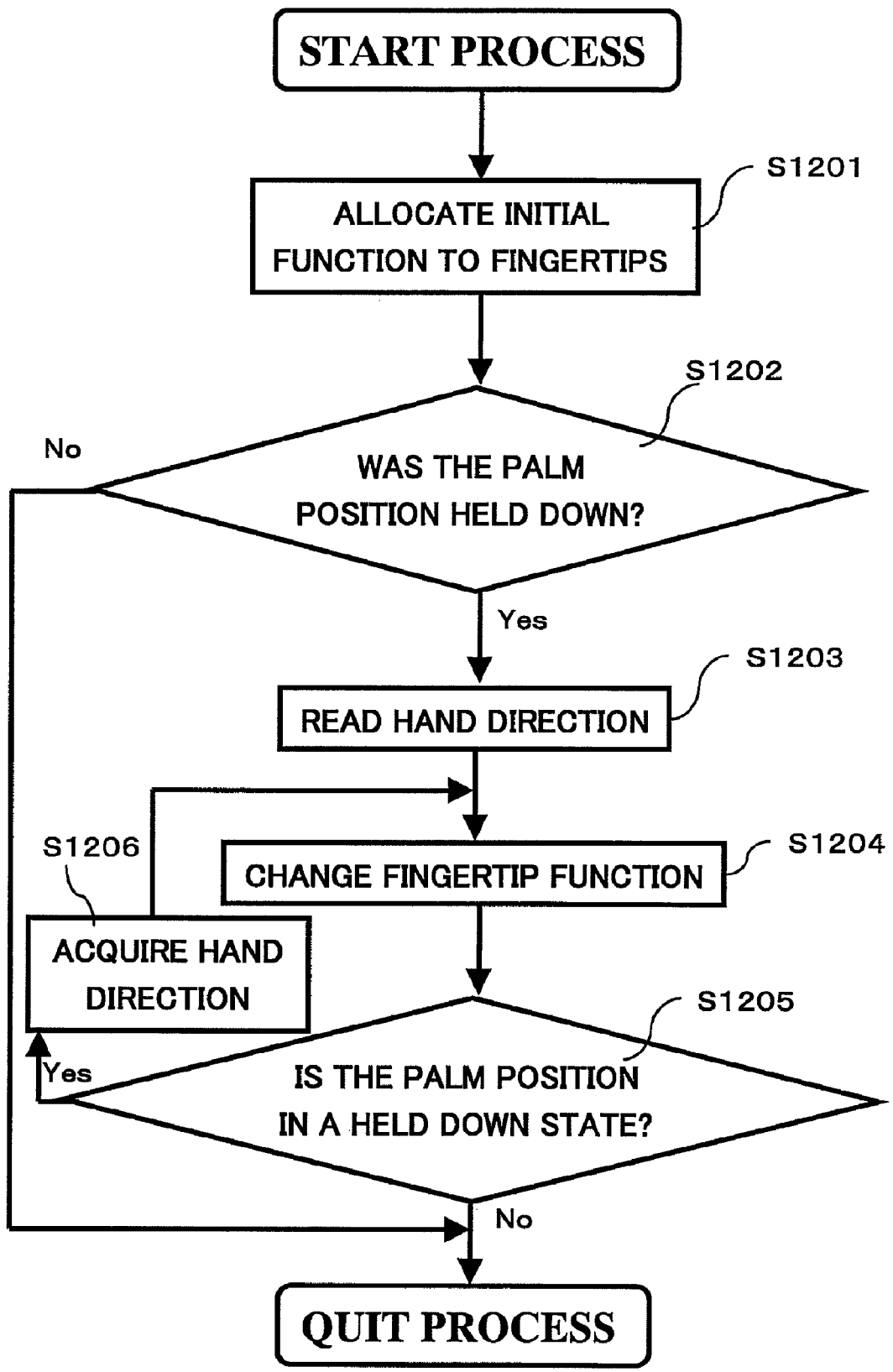
[FIG.12]

[FIG.13]
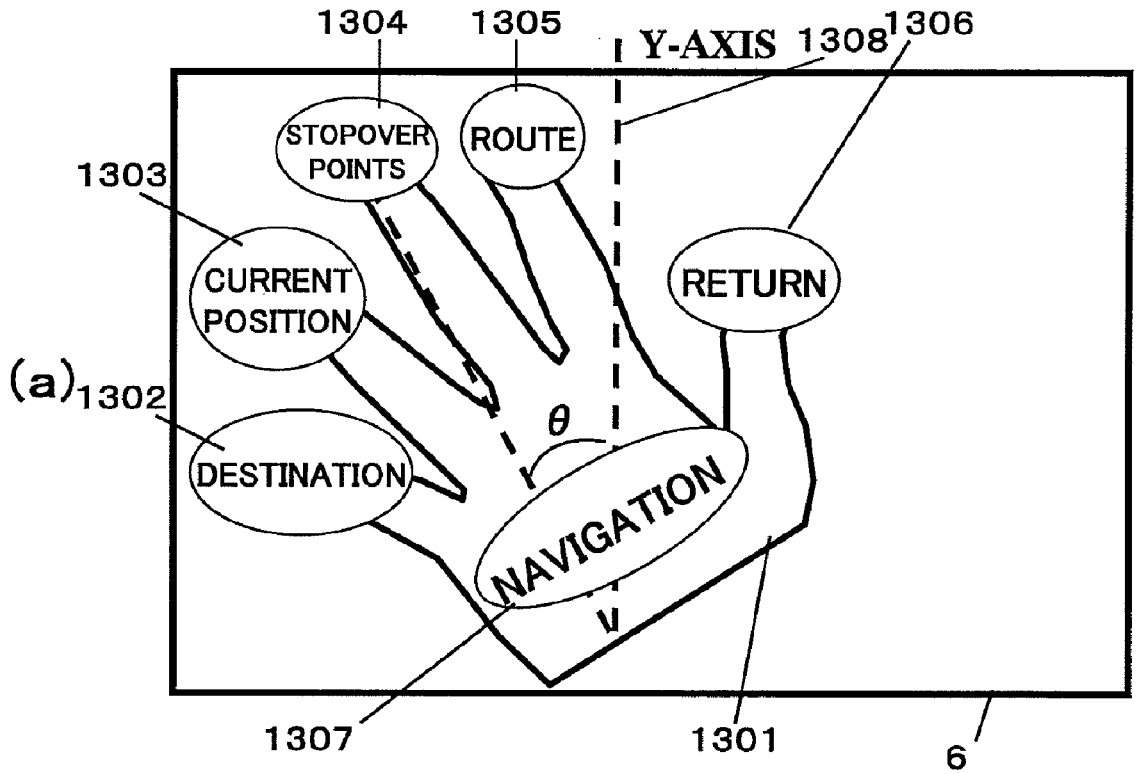
(a)
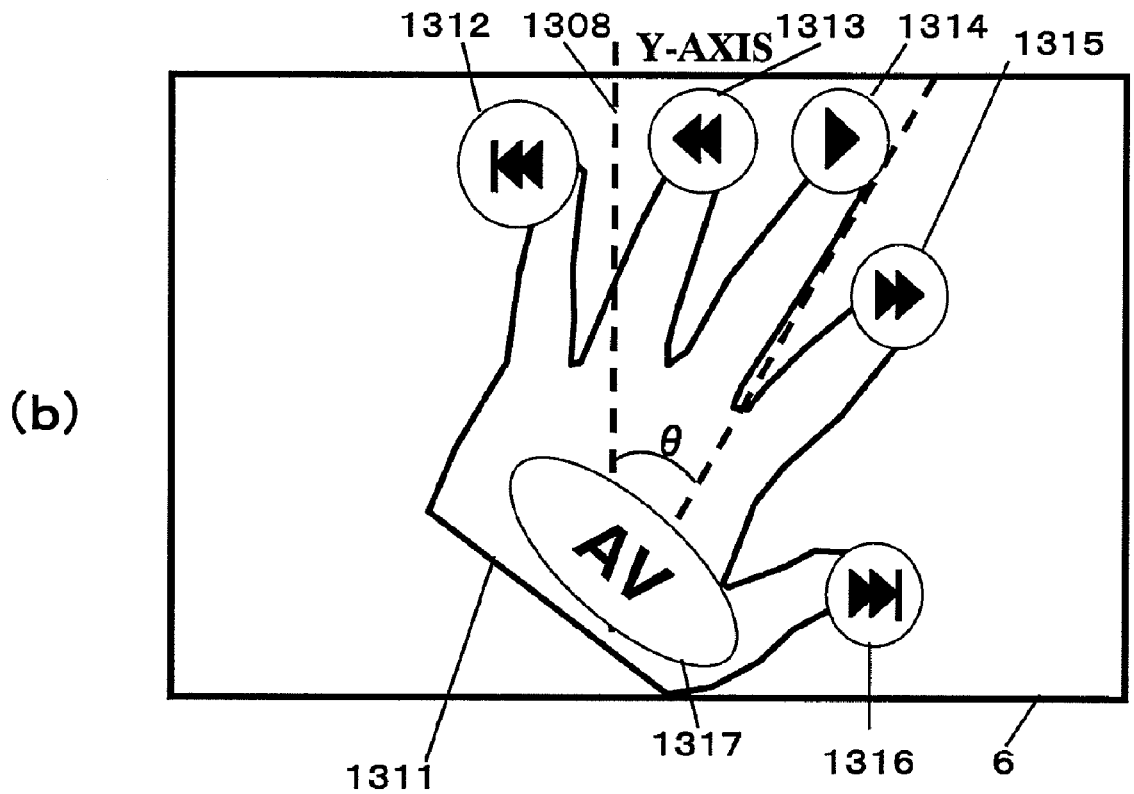
(b)

[FIG.14]
(a)
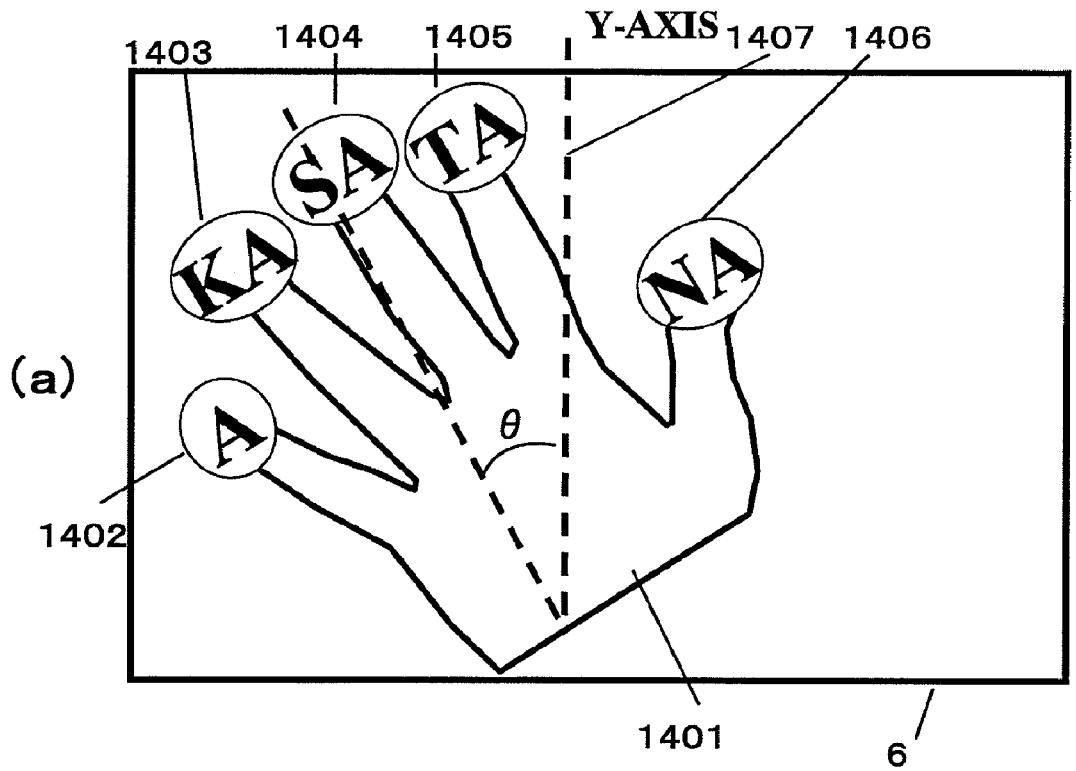
(b)
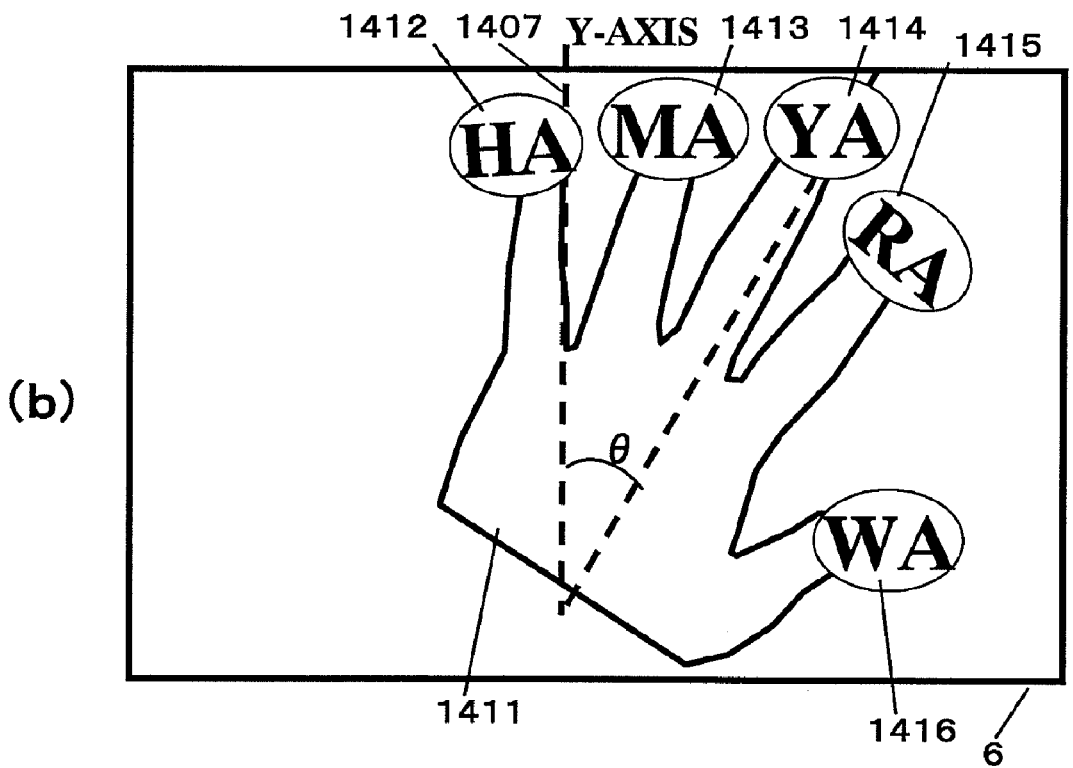

[FIG.15]
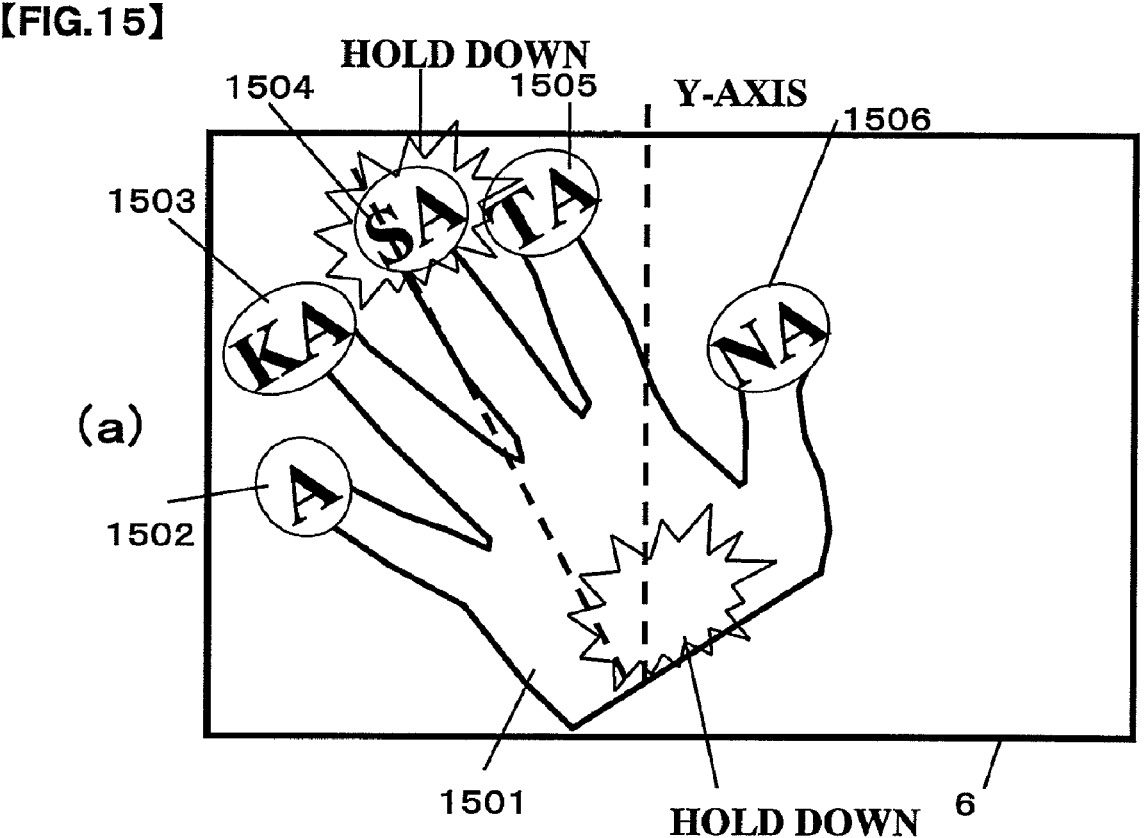
(a)
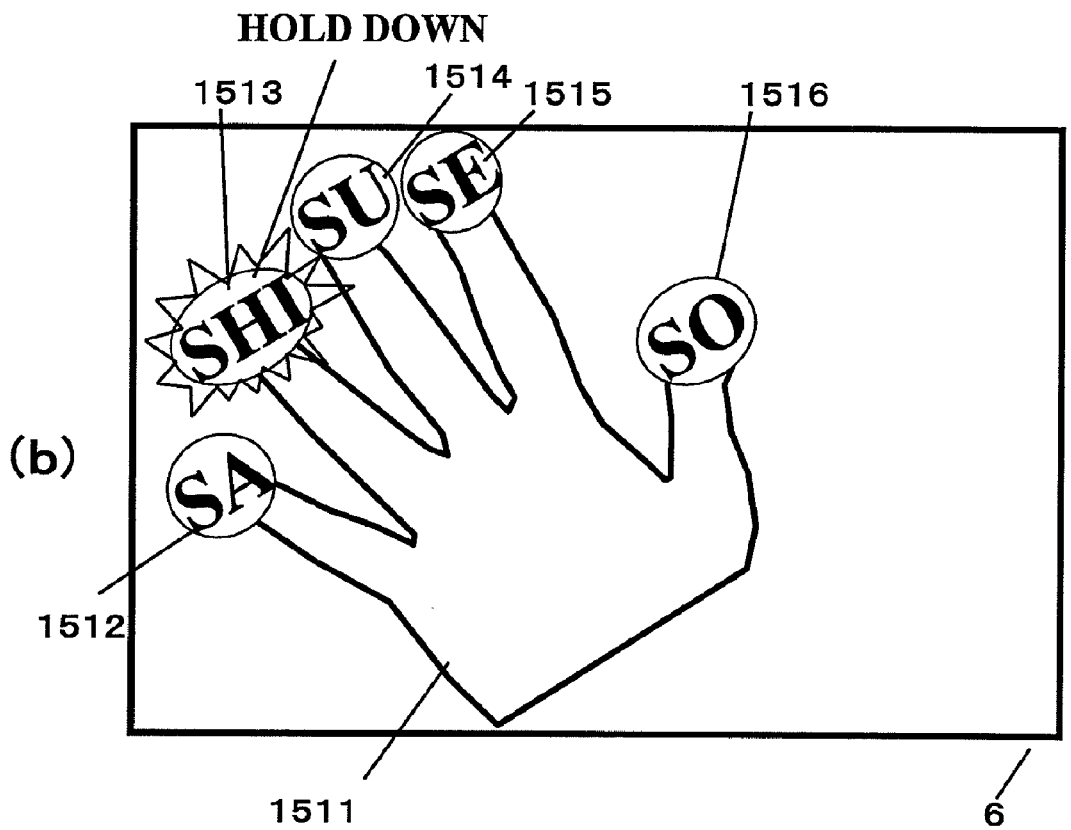
(b)

[FIG.16]
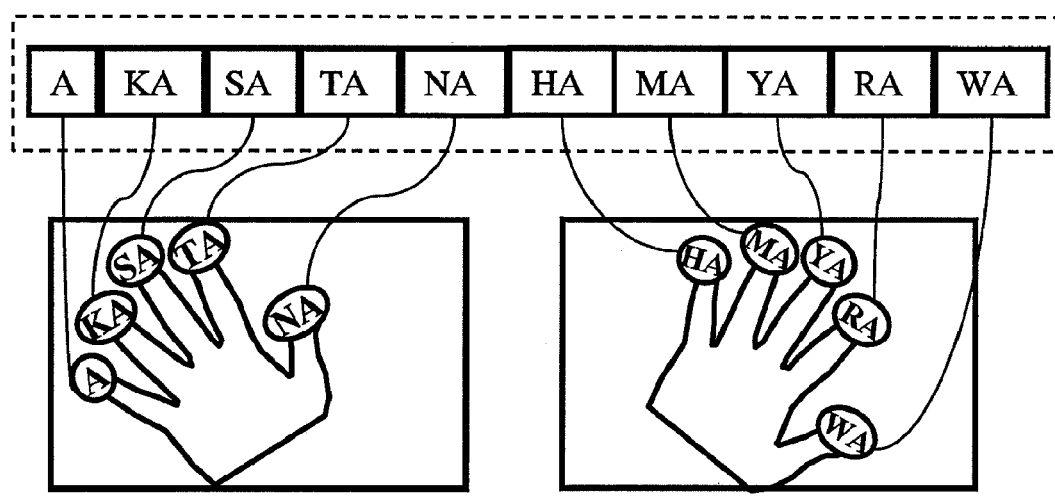

[FIG. 17]
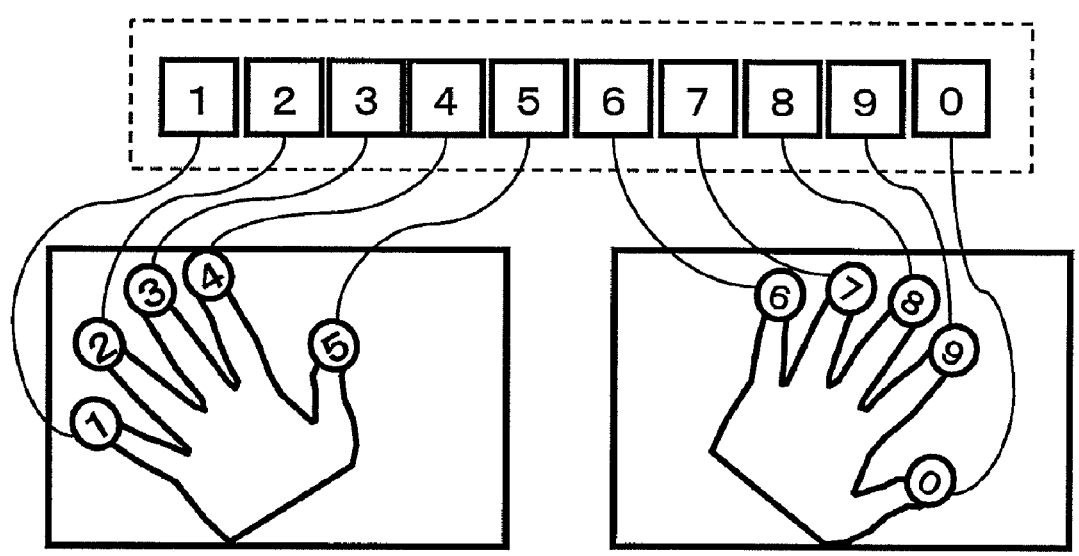

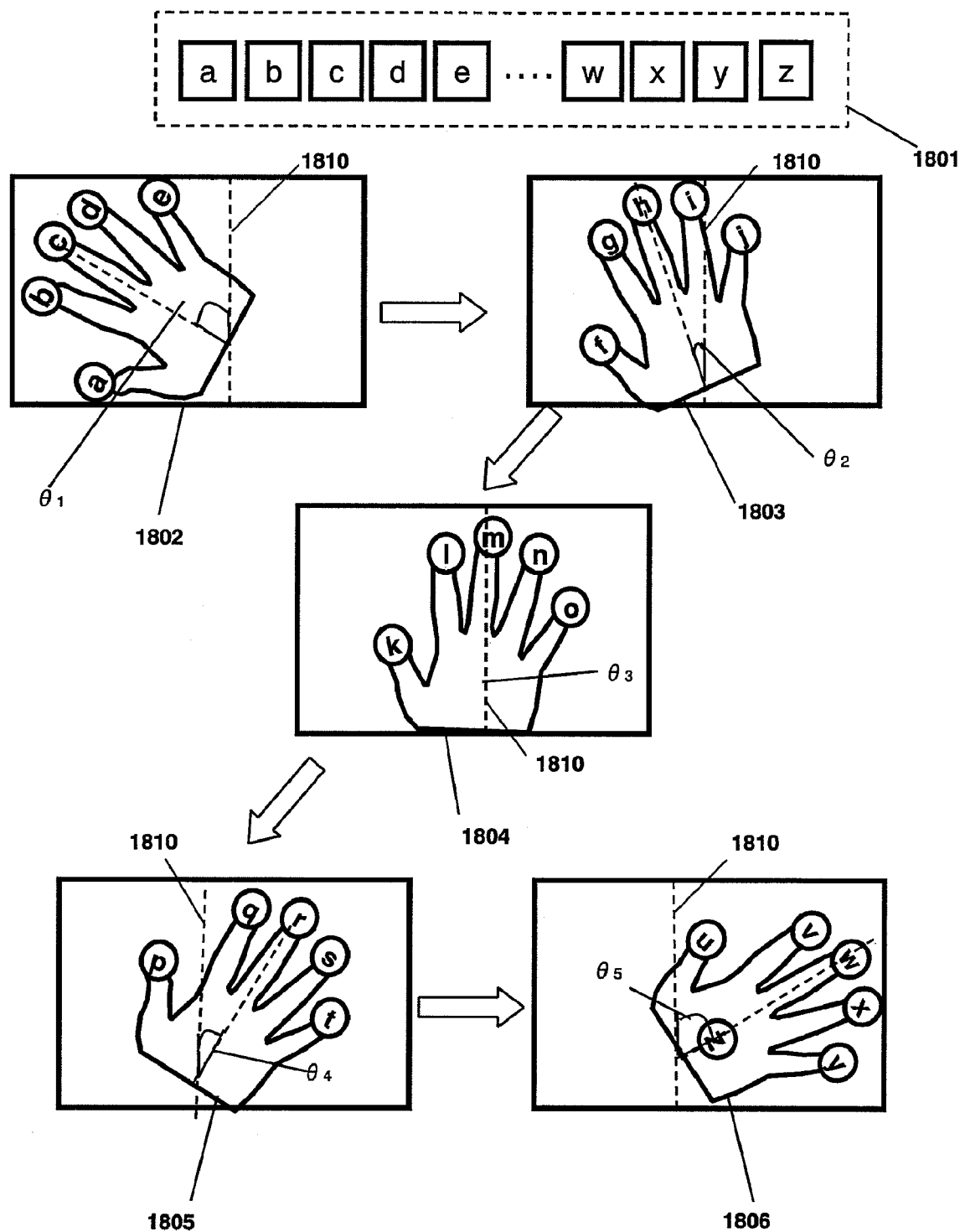
[FIG.18]

【FIG.19】
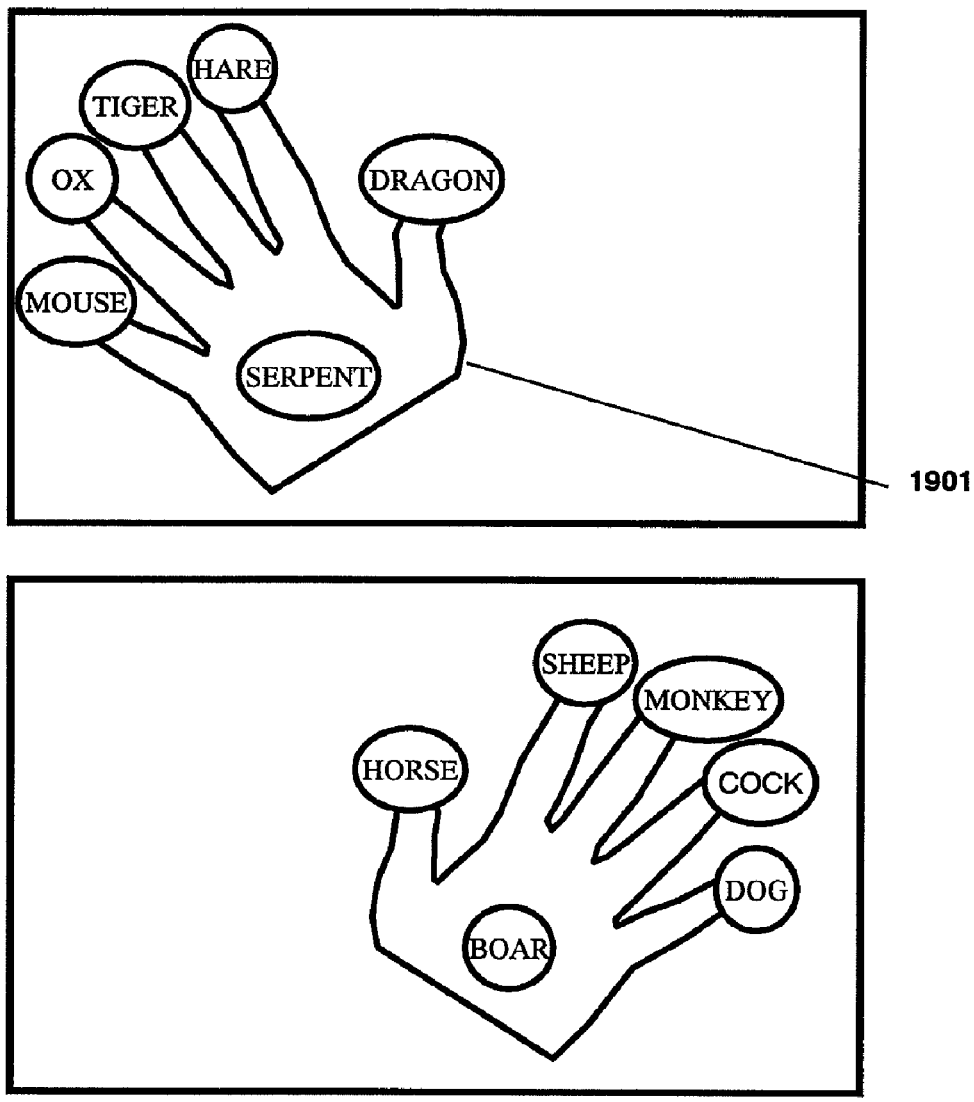

[FIG. 20]
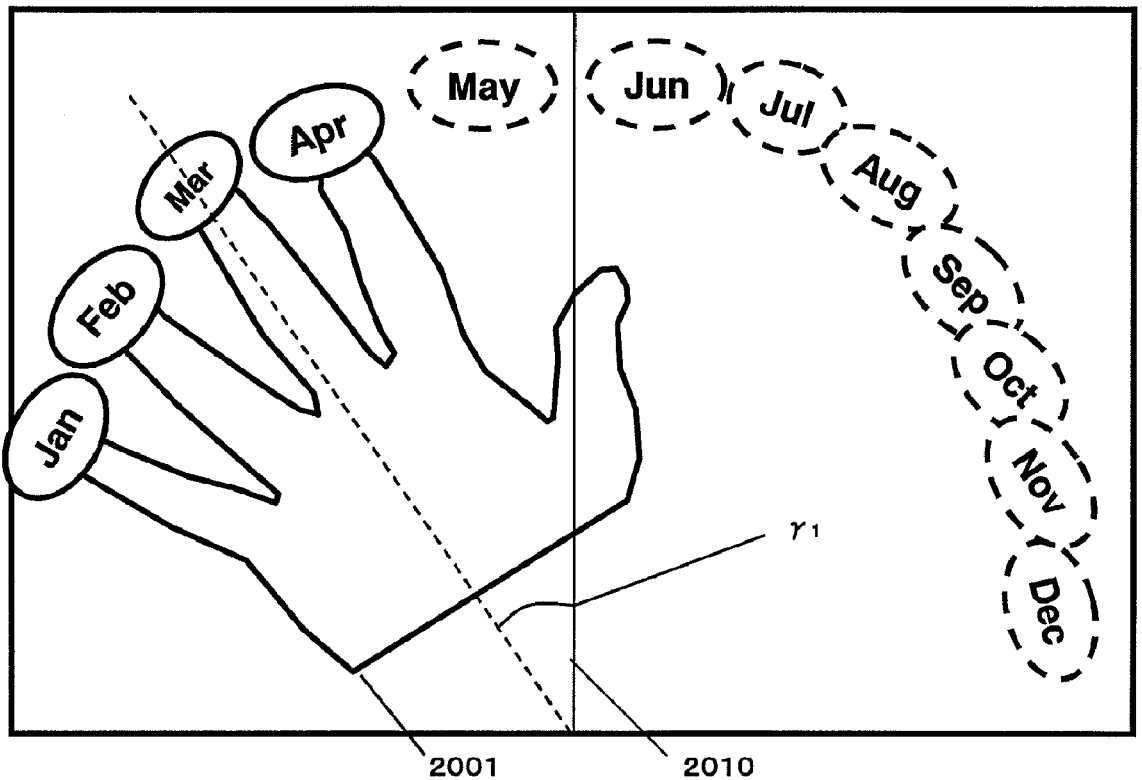
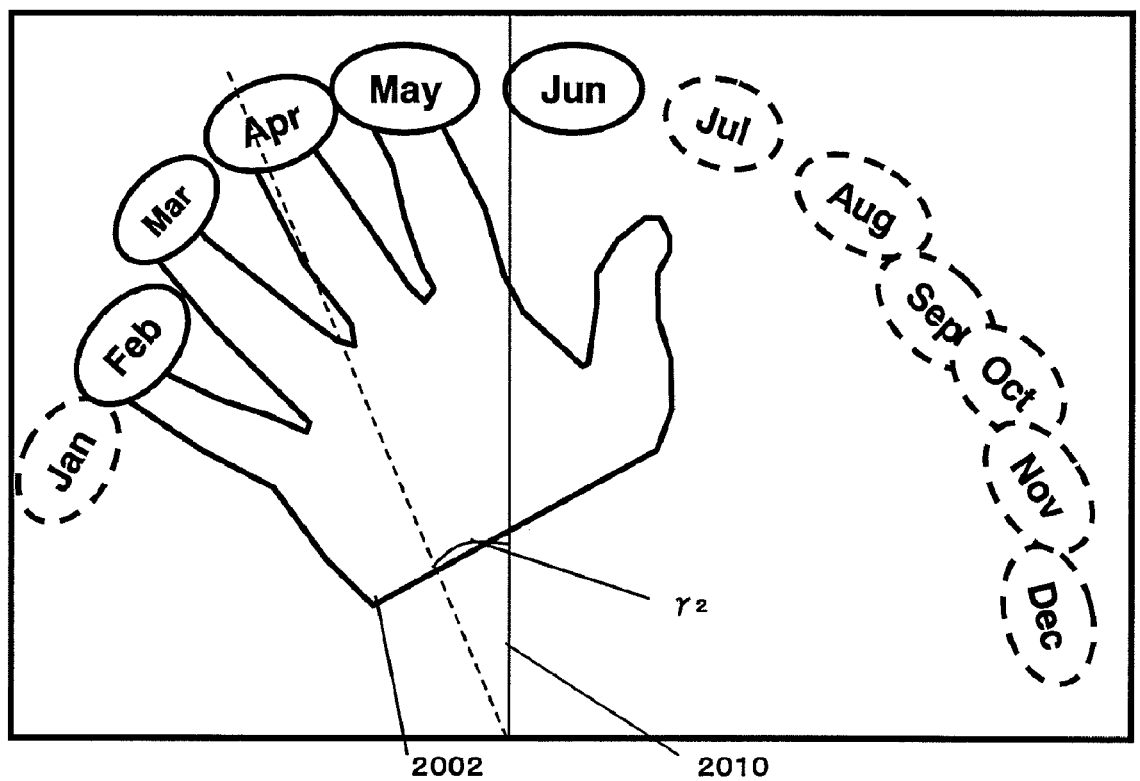

[FIG.21]
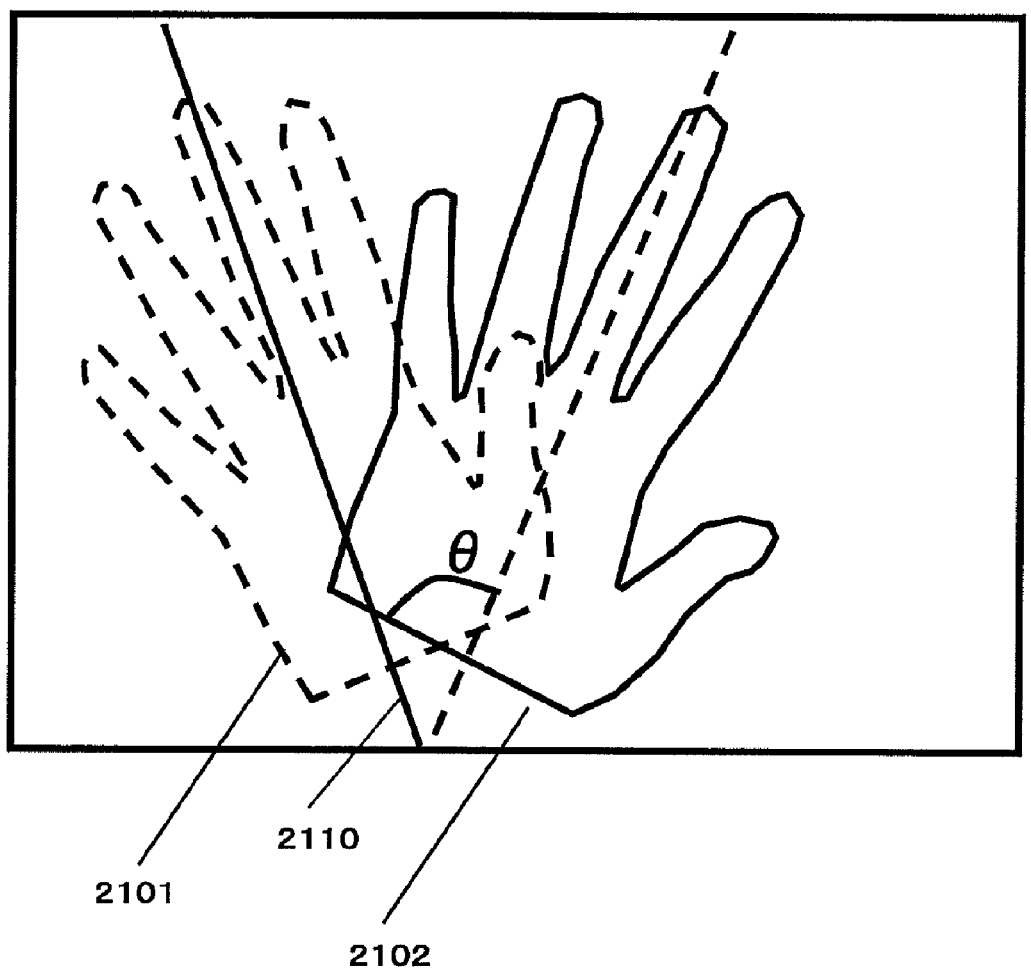

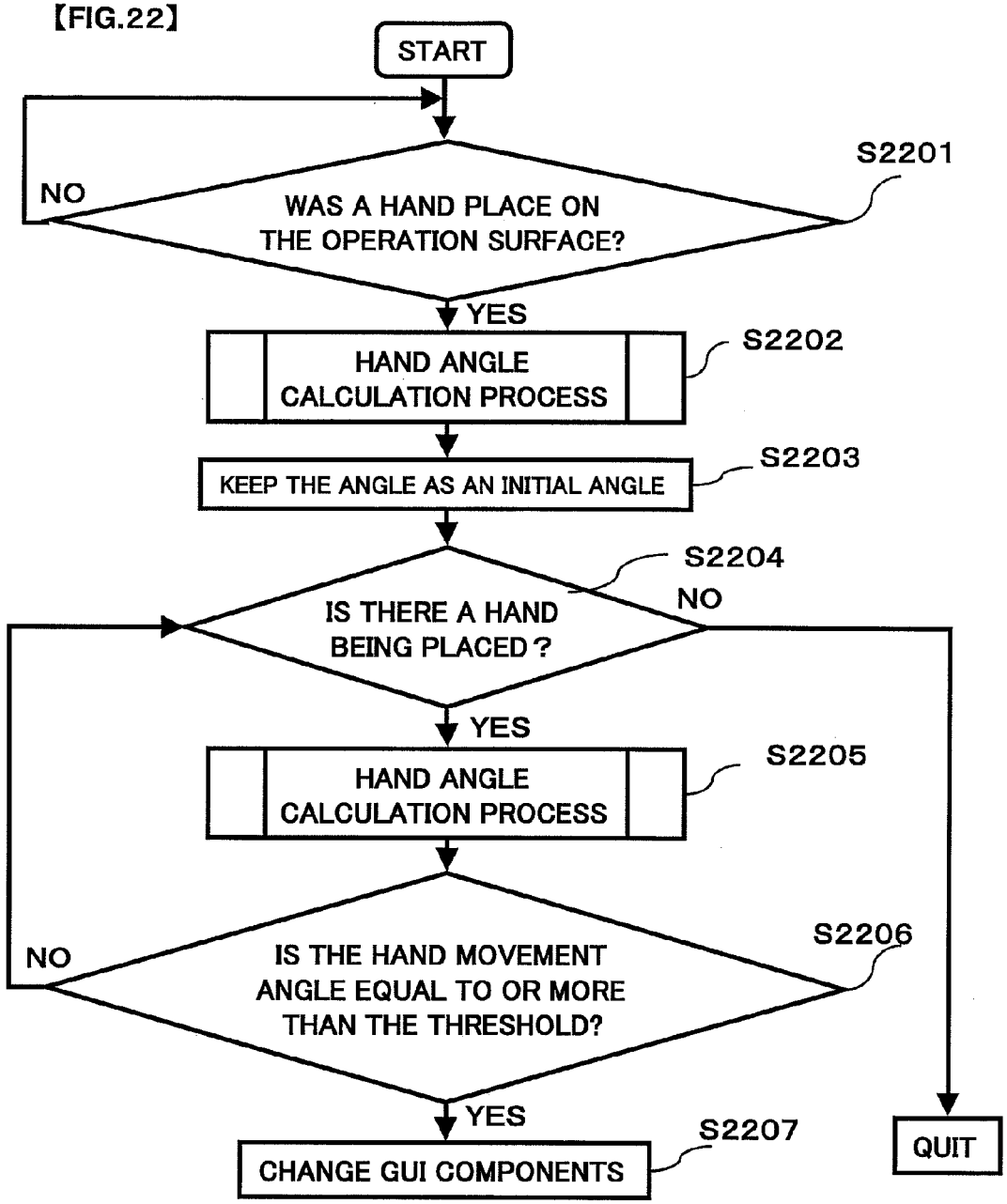

USER INTERFACE DEVICE

TECHNICAL FIELD

The current invention relates to a user interface device that is capable of executing each of the functions for operating an instrument by using fingertips; and more specifically, relates to a user interface device, which allocates each of the functions to fingertips in response to a hand movement and allows an operator to intuitively comprehend the allocation of each of the functions to the fingertips.

BACKGROUND ART

Conventionally, as an interface for utilizing a multi-functionalized instrument, there have been technologies capable of executing a desired function by appending a GUI button indicating different functions to a fingertip in response to a finger operation (held down position) (e.g. refer patent document 1).
Patent Document 1: (PCT) International Publication WO2006/104132

SUMMARY OF THE INVENTION

Problems to be Solved by the Invention

However, with conventional technologies, even though a function for operating an instrument is executed by hand, each of the functions is not allocated to fingertips in response to a hand movement; therefore, an operator cannot intuitively comprehend the allocation of each of the functions to the fingertips.

Therefore, the current invention takes into account the above described problem. Specifically, the objective is to provide a user interface device that allocates each of the functions for operating an instrument to fingertips in response to a hand movement, allowing an operator to intuitively comprehend the allocation of each of the functions to the fingertips.

Solution to the Problems

One aspect of the current invention is directed to a user interface device for operating an instrument. The current invention includes: a contact position acquiring section that detects a contact position of an operator on an operation surface; a hand shape acquiring section that acquires a hand shape of the operator; a hand shape direction acquiring section that acquires a direction of the hand shape based on the hand shape acquired by the hand shape acquiring section; a GUI (Graphical User Interface) button data storing section that stores GUI button data which represents a GUI button uniquely allocated to a function for operating an instrument; a GUI button allocation section that first allocates a GUI button, read out from the GUI button data storing section, to a fingertip in the hand shape acquired by the hand shape acquiring section, and then, reallocates, based on a direction change of the hand shape, the GUI button to a fingertip in the hand shape; a superimposed image creating section that creates a composite image of an image of a GUI button allocated by the GUI button allocation section and an image of the hand shape; and a displaying section that displays the composite image created by the superimposed image creating section.

Furthermore, the GUI button allocation section preferably reallocates sequentially an unallocated GUI button in accordance with the sequence of fingertips in the hand shape, every time an angle between the direction of the hand shape acquired by the hand shape direction acquiring section and a vertical direction reference axis of the operation surface becomes larger than a predefined angle.

In addition, the GUI button allocation section preferably sequentially reallocates an unallocated GUI button in accordance with the sequence of fingertips in the hand shape, every time an angle between the direction of the hand shape acquired by the hand shape direction acquiring section and a reference axis indicating a direction of the hand shape at the time the contact position acquiring section has detected a contact by the operator to the operation surface becomes larger than a predefined angle.

Moreover, the GUI button allocation section allocates a GUI button representing one character on each column in the Japanese 50 syllable table to each fingertip.

In this case, if any column in the Japanese 50 syllable table is selected, the GUI button allocation section preferably allocates, to each fingertip, GUI buttons representing characters that belong to the selected column.

Effect of the Invention

As described above, according to the current invention, a user interface device that allocates each of the functions for operating an instrument to fingertips in response to a hand movement and allows an operator to intuitively comprehend the allocation of each of the functions to the fingertips can be provided.

BRIEF DESCRIPTION OF THE DRAWINGS

FIG. 1 a schematic diagram showing an outlined configuration of a user interface device according to an embodiment of the current invention.

FIG. 2 is a figure showing one example of a case where the user interface device 1 shown in FIG. 1 is mounted in an automobile.

FIG. 3 is a functional block diagram for attaining the user interface device according to the embodiment of the current invention.

FIG. 4 is a figure showing one example of an image displayed by a displaying device 6 in FIG. 3.

FIG. 5 is a flowchart showing a flow of a process of the user interface device in FIG. 3.

FIG. 6 is a figure showing an example in which: a superimposed image creating section 36 in FIG. 3 is appending menu functions regarding navigation device operation to each of the fingers, and displaying it on the displaying device 6.

FIG. 7 is a functional block diagram of a hand shape parameter acquiring section 33 in FIG. 3.

FIG. 8 is a flowchart showing a flow of a hand shape parameter acquiring process of step S502 in FIG. 5.

FIG. 9 is a schematic diagram for describing a palm area acquiring method of step S804 in FIG. 8.

FIG. 10 is a schematic diagram for describing a fingertip position acquiring method of step S805 in FIG. 8.

FIG. 11 is a schematic diagram for describing a hand direction acquiring method of step S806 in FIG. 8.

FIG. 12 is a flowchart showing a flow of a fingertip function selecting process of step S503 in FIG. 5.

FIGS. 13(a) and (b) are schematic diagrams showing one example of a situation in which a function allocated to a fingertip is change based on hand direction θ by a fingertip function selecting process in FIG. 12; while FIG. 13(a) is a schematic diagram showing a situation in which a menu function regarding navigation device operation is allocated to the fingertip when the sign of θ is minus; and FIG. 13(b) is a schematic diagram showing a situation in which a function regarding operation of an AV device is allocated to the fingertip when the sign of θ is plus.

FIGS. 14(a) and (b) are schematic diagrams showing a situation in which a character allocated to a fingertip is changed based on hand direction θ by the fingertip function selecting process in FIG. 12 when inputting Japanese 50 syllables; while FIG. 14(a) is a schematic diagram showing a situation in which a character is allocated to a fingertip when the sign of θ is minus; and FIG. 14(b) is a schematic diagram showing a situation in which a character is allocated to a fingertip when the sign of θ is plus.

FIGS. 15(a) and (b) are schematic diagrams describing an input method when inputting a "SHI" character by Japanese 50 syllable input using the user interface device according to the embodiment of the current invention; while FIG. 15(a) is a schematic diagram describing an input method for "SA" column; and FIG. 15(b) is a schematic diagram describing an input method for "SHI".

FIG. 16 is a figure for describing a case where the sequence of HIRAGANA is allocated to each fingertip.

FIG. 17 is a schematic diagram for describing a case where the sequence of numbers is allocated to each fingertip.

FIG. 18 is a schematic diagram for describing a case where the sequence of alphabets is allocated to each fingertip.

FIG. 19 is a schematic diagram for describing a case where the sequence of Chinese zodiac signs is allocate to each fingertip.

FIG. 20 is a schematic diagram for describing a case where the sequence of months is allocated to each fingertip.

FIG. 21 is a schematic diagram describing a reference axis indicating an initial position where an operator's hand shape has been first placed on the operation surface.

FIG. 22 is a flowchart showing a flow of a user interface device process.

DESCRIPTION OF THE REFERENCE CHARACTERS 1 user interface device
2 touch panel
3 arithmetic processing machine
4 storage device
5 imaging device
6 displaying device
31 hand shape acquiring section
32 contact position acquiring section
33 hand shape parameter acquiring section
34 fingertip function selecting section
35 GUI image creating section
36 superimposed image creating section
101 light projection machine
401, 903, 1101, 1301, 1311, 1401, 1411, 1501, 1511, 1802, 1803, 1804, 1805, 1806, 1901, 2001, 2002, 2101, 2102 hand shaped image
402, 403, 1302 to 1306, 1312 to 1316, 1402 to 1406, 1412 to 1416, 1502 to 1506, 1512 to 1516 GUI button
701 hand shape extracting section
702 palm area determining section
703 fingertip position acquiring section
704 hand direction acquiring section
901 position of center of gravity
902, 904 concentric circle having the position of center of gravity 901 as a center
1001 to 1005 finger area image
1008 fingertip position
1104 hand direction θ
1106, 1308, 1407, 1810, 2010, 2110 reference axis

DETAILED DESCRIPTION OF THE INVENTION

A user interface device according to an embodiment of the current invention is described in the following with reference to the drawings. As a footnote, elements that are not particularly important for implementing the current invention are omitted in each of the drawings in view of visibility.

FIG. 1 is a schematic diagram showing an outlined configuration of the user interface device according to the current embodiment. In FIG. 1, a user interface device 1 includes, as a schematic configuration: a touch panel 2; an arithmetic processing machine 3; a storage device 4; an imaging device 5; and a displaying device 6. A case where the user interface device 1 in FIG. 1 is mounted, for example, in an automobile is shown as a schematic diagram in FIG. 2. The imaging device 5 takes an image from below the touch panel 2 which is an operation surface. An image outputted from the arithmetic processing machine 3 is displayed on the displaying device 6.

The touch panel 2 is, in the current embodiment, an input device capable of instructing the arithmetic processing machine 3 to execute a predefined function when being touched by the operator using, for example, each of the five fingers. A resistance type, an electrostatic capacitance type, an optical type, and the like can be used as a touch panel, and a positional coordinate point of the portion where the operator has touched is sent to the arithmetic processing machine 3.

The arithmetic processing machine 3 typically includes at least a processor and various memories, and operates in accordance with a computer program stored in a memory such as, for example, a ROM. Here, FIG. 3 is a functional block diagram of the arithmetic processing machine 3. In FIG. 3, the arithmetic processing machine 3 attains functions of: a hand shape acquiring section 31; a contact position acquiring section 32; a hand shape parameter acquiring section 33; a fingertip function selecting section 34; a GUI image creating section 35; and a superimposed image creating section 36, by executing the above described computer program.

The storage device 4 stores GUI button data and the like necessary for generating GUI images that needs to be displayed on the displaying device 6. The GUI button data is, for example, GUI image data such as an icon and a button.

In the current embodiment, the imaging device 5 is constructed of an infrared camera. The imaging device 5 is installed such that it has an angle of view that allows coverage of the operation surface installed to the touch panel 2; and the imaging device 5 photographs within a range of its angle of view at a predefined time interval and outputs a photographed image to the arithmetic processing machine 3. In FIG. 1, a light projection machine 101 is installed in order to allow the imaging device 5 to photograph a hand shape with greater ease. When the imaging device 5 is an infrared camera, it is desired if the wavelength of the light from the light projection machine 101 is a wavelength suitable for photographing with an infrared camera.

The displaying device 6 is constructed of a display such as liquid crystal, EL (Electro Luminescence), CRT, or the like. FIG. 4 shows one example of an image displayed on the displaying device 6. A hand shaped image 401 and GUI buttons 402, 403 are displayed. Functions allocated to the GUI buttons 402, 403 are executed when the operator touches, using a finger, a position on the touch panel 2 which corresponds to the displayed position of the GUI buttons 402, 403. The GUI buttons 402 are fixed on the displayed position regardless of a hand movement; however, the GUI buttons 403, showing functions allocated to each of the fingertips on a hand, change the displayed position by tracking the movement of the fingertips. A method for creating the hand shaped image will be described in the following.

Going back to FIG. 3, each of the functional blocks of the arithmetic processing machine 3 will be described. The arithmetic processing machine 3 includes: a hand shape acquiring section 31 that acquires an operator's hand image taken by the imaging device 5; a contact position acquiring section 32 that acquires, from the touch panel 2, a positional coordinate point where the operator has touched on the operation surface; a hand shape parameter acquiring section 33 that acquires various parameters of the hand shape from the acquired image of the hand shape on the operation surface; a fingertip function selecting section 34 that selects a function appended to a fingertip; a GUI image creating section 35 that creates a GUI image consisting of GUI buttons representing functions appended to fingertips and a background image; a superimposed image creating section 36 that superimposes and outputs: the hand shaped image acquired by the hand shape parameter acquiring section 33 and the GUI image created by the GUI image creating section 35, as a single image.

Next, a flow of a process of the user interface device of the current embodiment is described in reference to a flowchart in FIG. 5.

First, the operator starts an operation by placing a hand on the operation surface. At step S501, the hand shape acquiring section 31 acquires an operator's hand shape image that is on the operation surface and has been taken by the imaging device 5.

At step S502, the hand shape parameter acquiring section 33 extracts a characteristic value (parameter) of the hand shape acquired by the hand shape acquiring section 31. Those that are extracted here as parameters are, a position of center of gravity of a palm, an area of the palm (palm area), a fingertip position, a direction of a hand (hand direction), and the like. Since the parameters extracted here will be used in a process later, they are stored in the storage device 4. This step S502 of a hand shape parameter acquiring process will be describe later in detail.

Next, at step S503, the fingertip function selecting section 34 conducts a process of determining which function is to be appended to each finger. A specific selection method for allocating a function to each finger is later described in detail. The fingertip function selecting section 34 corresponds to a GUI button allocation section.

At step S504 of a superimposed image creating process, the GUI image creating section 35 reads out, from the storage device 4, the GUI button data that uniquely corresponds to a function allocated to each finger at step S503; and generates a GUI button image.

Then, the superimposed image creating section 36 creates a superimposed image of a composite image where the created GUI button image is appended to the hand shaped image and a GUI image that is displayed in the background; and displays the superimposed image on the displaying device 6. Detailed description of this step S504 of the superimposed image creating process is omitted, since a publicly known technology can be used (e.g. refer (PCT) International Publication WO2006/104132).

One example of an image of GUI buttons appended to each finger of the hand shaped image is shown in FIG. 6. FIG. 6 is an example where: the operator places the left hand on the operation surface, and menu functions regarding navigation device operation are appended to each finger and displayed on the displaying device 6.

Back to FIG. 5, at step S504, if a process regarding displaying a GUI image ends, at the next step S505, whether the operator has touched the operation surface or not is judged based on a signal from the contact position acquiring section 32.

At this point, if it is judged that the operator has not touched the operation surface (No), it returns to step S501. If it is judged that the operation surface is held down at step S505 (Yes), a held down position is acquired from the contact position acquiring section 32 (step S506). Then, at step S507, it is judged whether or not this position is an area that corresponds to the GUI button displayed on the displaying device 6.

At step S507: if it is judged that the held down position is not a GUI button position (No), it returns to step S501; and if it is judged that it is a GUI button position (Yes), it proceeds to step S508, and a function that uniquely corresponds to the GUI button at the held down position is executed and the series of processes ends.

Next, the hand shape parameter acquiring process of step S502 in FIG. 5 is described in detail. The process of the hand shape parameter acquiring process is conducted by the hand shape parameter acquiring section 33. A functional block diagram of the hand shape parameter acquiring section 33 is shown in FIG. 7. The hand shape parameter acquiring section 33 is constructed of: a hand shape extracting section 701 that extracts only a hand shape from the image acquired by the hand shape acquiring section 31; palm area determining section 702 that acquires a palm position; a fingertip position acquiring section 703 that acquires a fingertip position; and a hand direction acquiring section 704 that acquires a direction of a hand (hand direction).

A flowchart of the hand shape parameter acquiring process is shown in FIG. 8. First, at step S801, the hand shape extracting section 701 conducts a binarization process of the image acquired at step S501.

Next, at step S802, the hand shape extracting section 701 removes noise from an image that has been binarized at step S801, and extracts only an image of the hand shape. Here, noise is a span other than the area that represents the hand shape. One specific method for extracting only a hand shape image is a method that recognizes, as a hand shape, the maximum area among the areas that are connected as a whole in a binarized image.

Next, at step S803, the hand shape extracting section 701 saves, in the storage device 4, the image of only the hand shape extracted at step S802. The hand shaped image saved at this point is used when a superimposed image is created at the superimposed image creating process of step S504.

Next, at steps S804 to S806, acquisitions of hand parameters such as the position of center of gravity of the palm, the palm area, the fingertip position, the direction of the hand (hand direction), and the like, are conducted. First, at step S804, the palm area determining section 702 acquires the position of center of gravity of the hand shaped image extracted at step S802 and the palm area where fingertips are excluded from the hand shaped image.

FIG. 9 is a schematic diagram for describing a palm area acquiring method, and the palm area determining section 702 calculates a position of center of gravity 901 from the hand shape image extracted at step S802. Next, a circle 902 that has the position of center of gravity 901 as the center is drawn, and then the radius of the circle is progressively enlarged.

Next, the enlargement of the circle radius is stopped when an overlapped area size of the hand shaped image 903 and the circle becomes equal to or more than a certain threshold. Now, assume the enlargement of the circle radius has been stopped at a circle 904. The overlapped area of the circle area and the hand shaped image 903 at this point is regarded as the palm area.

Then, the palm area is cut out from the previous hand shaped image 903, and, as shown in FIG. 10, images showing areas with only fingertips are created. Next, the palm area determining section 702 saves the obtained position of center of gravity 901 and the palm area in the storage device 4. Furthermore, the images showing areas with only fingertips, which are used in the following step S805, are also saved in the storage device 4.

A fingertip position acquiring process of step S805 is described in the following in reference to FIG. 10. The fingertip position acquiring section 703 obtains an ellipse 1006 through an ellipse fitting process against area images 1001 to 1005 of each finger. Then, the fingertip position acquiring section 703 obtains a major axis 1007 of the ellipse, and acquires a position, which is a position where the major axis 1007 and the contour of the ellipse 1006 intersects and is on the opposite side of the palm area, as a fingertip position 1008. After acquiring the fingertip position 1008 for all finger areas, the fingertip position acquiring section 703 saves the acquired fingertip position 1008 in the storage device 4. At this point, right hand or left hand is judged based on finger length, finger thickness, finger sequence, and the like; and the finger identity (thumb, index finger, middle finger, ring finger, or little finger) of each finger is determined and saved in the storage device 4 together with an information of the corresponding fingertip position 1008.

A hand direction acquiring process of step S806 is described in the following in reference to FIG. 11. The hand direction acquiring section 704 calculates a circumscribing rectangle 1102 of a hand shaped image 1101 acquired at step S802. At this point, a long side direction 1103 of the rectangle 1102 is acquired as a hand direction, and an angle 1104 between the hand direction and a vertical direction (Y-axis) of an operation surface 110S is acquired as a hand direction θ. Here, a clockwise direction from the Y-axis is defined as a plus direction of θ. And the hand direction acquiring section 704 saves the acquired hand direction θ in the storage device 4. Furthermore, a vertical direction is a longitudinal direction (generally configured as Y-axis) when viewed from the operator in a two-dimensional orthogonal coordination system configured on the operation surface where the operator operates. After acquiring various parameters regarding the hand shape at steps S804 to S806, the hand shape parameter acquiring process in FIG. 8 ends.

A fingertip function selecting process of step S503 in FIG. 5 is described in the following in reference to a flowchart in FIG. 12. This fingertip function selecting process is conducted at the fingertip function selecting section 34.

First, at step S1201, the fingertip function selecting section 34 allocates an initial function for the fingertip position obtained at step S805 in FIG. 8. Here, an initial function is one part among: various commands for operating an instrument; and characters or the like when inputting Japanese 50 syllables, inputting alphabet, and the like, and the initial allocation of function to finger is configured in advance and stored in the storage device 4. The information obtained at step S805 identifying a fingertip position to a finger identity is used for the allocation of this initial function.

Next, at step S1202, the fingertip function selecting section 34 judges whether an operation surface is held down in the palm area acquired at step S804. At this point, as the method for judging whether the palm area is held down, first, a span of the palm area acquired at the palm area acquiring process of step S804 in FIG. 8 is configured as a collision detection area.

Next, when the contact position acquired by the contact position acquiring section 32 exists in the span of the collision detection area, it is judged that the operation surface at the palm area is held down. In case the operation surface of the palm area is judged to be held down at step S1202 (Yes), the process moves to step S1203; and in case the palm area is judge not to be held down (No), the process ends.

Next, the hand direction θ saved in the storage device 4 at step S806 in FIG. 8 is read out at step S1203. Then, at step S1204, the fingertip function selecting section 34 changes the function allocated to the fingertip. By having this judging process at step S1202, it is possible to change functions allocated to each fingertip only when the operator places a palm on the operation surface. Which means, even when a hand direction changes, an allocated function is prevented from being changed unintentionally, unless the operator places a palm on the operation surface.

A situation, in which a function of a fingertip is changed, is described in the following in reference to FIGS. 13(*a*) and (*b*). FIGS. 13(*a*) and (*b*) are figures displaying hand shaped images and GUI buttons which are being superimposed on the displaying device 6. In FIG. 13(*a*), as an initial function of each finger, GUI buttons 1302 to 1306 representing menu functions regarding operation of a navigation device are appended to each fingertip on a hand shaped image 1301. Here, the sign of the hand direction θ is minus. To the little finger, a GUI button 1302 for destination configuration; to the ring finger, a GUI button 1303 for displaying the current position on a map; to the middle finger, a GUI button 1304 for configuring stopover points; to the index finger, a GUI button 1305 for route configuration; and to the thumb, a GUI button 1306 for returning to the previous situation, are respectively allocated.

Then, when the operator changes the hand direction and the sign of the hand direction θ becomes plus: the GUI buttons configured to each fingertip of hand shaped image 1311 are changed to GUI buttons 1312 to 1316 representing functions regarding operation of an AV (Audio Visual) device as shown in (b) of FIG. 13.

To the little finger, a GUI button 1312 for skipping back one tune; to the ring finger, a GUI button 1313 for rewinding; to the middle finger, a GUI button 1314 for playing a tune; to the index finger, a GUI button 1315 for fast-forwarding; and to the thumb, a GUI button 1316 for skipping forward one tune, are respectively allocated. Furthermore, the menu entries changed here may be configured by the operator.

Back to FIG. 12, at step S1205, as judged similarly at step S1202, the fingertip function selecting section 34 judges whether the operation surface is in a held down state by the palm. In case it is judged that it is in a held down state (Yes), the process moves to step S1206; and in case the palm is removed from the operation surface and it is not in a held down state (No), the fingertip function selecting process ends.

At step S1206, as done similarly at step S806 in FIG. 8, after detecting the hand direction θ, the process goes back to step S1204, and functions allocated to each fingertip are changed. The judging process of step S1205 exists in order to allow the operator to change functions allocated to each fingertip only by changing hand direction while placing the palm on the operation surface.

The functions appended to fingertips are not limited to the functions of a navigation device or the functions of the AV device; and, for example, as shown in FIGS. 14(*a*) and (*b*), GUI buttons representing Japanese 50 syllable input functions may be appended.

In FIGS. 14(*a*) and (*b*), when the hand direction θ is minus, as shown in FIG. 14(*a*), GUI buttons 1402 to 1406 representing "A", "KA", "SA", "TA", and "NA" are appended to each fingertip sequentially from the little finger to the thumb; and when the hand direction θ is plus, as shown in FIG. 14(*b*), GUI buttons 1412 to 1416 representing "HA", "MA", "YA", "RA", and "WA" are appended to each fingertip sequentially from the little finger to the thumb.

The method to input Japanese 50 syllables is as follows: if a button appended to each finger is held down while a palm is held down on the operation surface, a character in that column is allowed to be inputted. As just described, by allocating all the columns from "A" to "WA" to each of the fingers together with the sign of hand direction θ, Japanese 50 syllable inputting is made possible. For example, if one wants to input the character "SHI", as shown in (a) of FIG. 15, while holding down the palm, operation surface is held down by the middle finger allocated with a GUI button 1504 representing the "SA column" input. Then, when the palm is removed from the operation surface, as shown in FIG. 15(*b*), GUI buttons 1512 to 1516, representing each of the characters in the "SA column" which are "SA", "SHI", "SU", "SE", and "SO", are appended to the fingertips sequentially from the little finger to the thumb. Here, since each of the columns in the Japanese 50 syllable table includes five characters, it is possible to automatically append the characters to five fingers. Then, "SHI" is inputted by holding down the operation surface by the ring finger appended with GUI button 1513 representing the desired "SHI".

A stable character input is made possible even under a vibrating environment, by, as just described: selecting a column with the first motion; appending the five characters in the selected column to each finger; and inputting a character by holding down the operation surface with one of the fingers. Furthermore, in FIG. 15(*b*), since the palm is removed from the operation surface and the fingertip function selecting process has ended, characters appended to the fingertips do not change even if a hand angle is changed during the input of each character. When inputting a different character next, it is necessary to change the functions allocated to each fingertip by holding down the operation surface with a palm.

As described above, the user interface device of the current embodiment allows a stable input operation even under a vibrating environment without having a larger operation surface size, since a function allocated to a fingertip can be changed easily by only changing a hand direction.

Furthermore, when applying this to the Japanese 50 syllable input, there is an advantageous effect of easily conducting an input operation since the number of characters allocated to one hand is five, therefore characters allocated to fingertips can be changed easily.

Still further, in the above described embodiment, the hand shape acquiring section 31 acquires the hand shape image taken by the imaging device 5; however, the hand shape of the operator can be acquired by using a common method other than an infrared camera as long as it is capable of acquiring a contour of the operator's hand. For example, a contour of a hand in proximity can be acquired by using a touch panel such as an electrostatic capacitance type and the like. In this case, a publicly known technology (e.g. refer (PCT) International Publication WO2006/027924) can be used. Furthermore, the hand shape acquiring section 31 may be configure to: estimate a model of a hand based on parameters of the hand such as a position of center of gravity of a palm, a palm area, a fingertip position, and a direction of the hand (hand direction); and acquire the estimated model from a model storing section.

Here, in the case where the hand shape acquiring section 31 acquires the hand shape by the touch panel 2, the imaging device 5 is unnecessary and a contact position where the hand has touched the operation surface can be detect simultaneously. Additionally in this case, the binarization process of step S801 in FIG. 8 is unnecessary since a signal representing a hand shape that has been already binarized can be acquired.

Moreover, in the above described embodiment, as the image that is acquired by using the infrared camera, an image at a near-infrared light range that allows acquisition of a hand shape image without being influenced by an incident light from outside an automobile is desired; however, a wavelength range other than this may be used.

As previously described, an advantageous effect of appending a HIRAGANA inputting function to a fingertip is that, as shown as HIRAGANA in FIG. 16, a user imagines "HA MA YA RA WA" as those that follows the sequence of "A KA SA TA NA" based on experience; therefore, the operator can intuitively comprehend easily that a function for inputting the following "HA MA YA RA WA" will be appended to the fingertip by changing an inclination of the hand.

Furthermore, besides the sequence of HIRAGANA, in a case with the sequence of numbers, shown in FIG. 17, an operator can easily imagine the next number allocated to a fingertip if an inclination of the hand is changed.

Still further, in the current embodiment, since the inclination of a hand is used as a trigger for changing a function appended to a fingertip, not a change between functions of only two phases in response to an angle of a hand inclination, but also more functions can be appended.

As one example of changing multiple functions, an allocation change of an alphabet 1801 shown in FIG. 18 is conceivable. Normally, a user imagines an alphabet sequence as shown as the alphabet 1801 in FIG. 18 based on experience.

As shown by a hand shaped image 1802, functions for inputting alphabets "a" to "e" are sequentially allocated to each of the fingers when the angle between the hand and a reference axis in the vertical direction of the operation surface is θ1. Furthermore, the hand shaped image 1802 displays this allocation from angle θ1 to angle θ2, and when the angle is larger than θ2, the sequence is changed to "f" to "j" as shown by the next hand shaped image 1803. After this point, the sequence of each of the functions changes by having θ3, θ4, and θ5 as thresholds. The threshold angle may also be changed by the operator.

As described here, a configuration may be adopted, in which every time an angle, between the direction of a hand shape and a reference axis in a direction vertical to the side-center-side of a screen of a displaying section, becomes more than a predefined angle; an unallocated GUI button is reallocated sequentially in accordance with the sequence of each fingertip in the hand shape.

Furthermore, as shown in FIG. 18, it is conceivable that there is a case in which a single character "z" cannot be appended to a finger after an attempt to append all alphabets. In this case, as shown by a hand shaped image 1806, the character "z" may be inputted by displaying "z" as the only button in a palm portion and by a pressing-in motion of a palm.

Additionally, as examples of a case where the total number of menus is twelve, as shown in FIG. 19, examples such as displaying Chinese zodiac signs and displaying constellations are conceivable. In the case with Chinese zodiac signs as shown in FIG. 19, as shown by a hand shaped image 1901, a function is also appended on the palm at the first phase of sequence when inclined to the left, and appending a total of twelve functions is attained when inclined to the right.

Furthermore, in the current embodiment, all the functions on the fingertips have been changed when the angle has exceeded or fallen below a certain threshold; however, there is a conceivable case in which the functions on the fingertips are changed gradually in response to an angle of the hand and not having the functions of all the fingers changed at the same time. One example is described next in reference to FIG. 20.

FIG. 20 shows an operation allowing input of the names of the "Months" by pressing-in an operation surface where the names of the "Months" are appended to each finger. In FIG. 20, only the GUI components represented by solid lines are actually displayed on a displaying section, and the GUI components represented by dashed lines are graphics representing a sequence of GUI components that the user would probably imagine.

First, as shown as a hand shaped image 2001, when an angle is γ1, months from January to April are appended. Then, as shown as a hand shaped image 2002, when the angle is γ2, all the functions appended to each of the fingers are shifted by one and displayed. A display with the hand shaped image 2002 shows a display that has proceeded one step forward. In the hand shaped image 2002, a GUI component showing January disappears from the displaying section, and in turn, a GUI component representing May is appended to the index finger. Furthermore, other GUI components are also shifted by one and displayed, as shown in the figure.

As a method for acquiring the hand inclination, other than the previously described method of fixing the reference axis to the vertical direction of the operation surface, a method of calculating an angle relative to a direction of the hand placed on the operation surface at the beginning by the operator is also conceivable. A configuration may be applied in which: a direction of a hand shape at the time when the contact position acquiring section 32 first detects contact of the operator to the operation surface is defined as a new reference axis; and an unallocated GUI button is reallocated sequentially in accordance with the sequence of each fingertip in the hand shape, every time an angle between the direction of the hand shape and the reference axis becomes larger than a predefined angle. By adopting this method, operability improves further since the hand shape direction, where the operator naturally has placed a hand on the operation surface, is defined as the reference axis, and it becomes unnecessary for the operator to mind the vertical direction of the operation surface as being the reference axis.

As shown in FIG. 21, a hand shape represented by a dashed line of a hand shaped image 2101 is registered as the initial position of the hand shape placed by the operator at the beginning. A hand shape represented by a solid line of a hand shaped image 2102 shows the current hand position. Here, angle θ shown in the figure is used as a hand inclination parameter. A flow of the specific process is described next in reference to FIG. 22.

First, at S2201, it is judged whether the operator's hand is on the operation surface or not. If the operator's hand is judged to be on the operation surface, an angle of the hand is calculated (S2202). Next, at S2203, the angle (initial angle) calculated at S2202 is stored in a memory area in the arithmetic processing machine 3.

Next, at S2204, it is judged whether the hand is placed or not. At this point, if it is judged that the hand is removed, the following process is not conducted and the process ends.

Next, at S2205, the current hand angle calculation is conducted. Here, at S2206, it is judged whether or not the angle between the current hand angle and the initial angle calculated at S2202 is equal to or more than a predefined threshold; and if it is judged to be equal to or more than the threshold (Yes at S2206), the allocation of GUI components to each of the fingers is changed. At S2206, if it is less than the threshold, the process returns to S2204.

As described above, according to the current invention, a user interface device, which allocates each of the functions to fingertips in response to a hand movement and allowing an operator to intuitively comprehend the allocation of each of the functions to the fingertips can be provided.

In the above described embodiment, the GUI button data, the hand shaped image, the characteristic value (parameter) of the hand shape, and the like are stored in the storage device 4; instead, they may be stored in a memory included inside the arithmetic processing machine 3.

Furthermore, the vertical direction of the operation surface is defined as the reference axis for detecting the hand shape direction; instead, the vertical direction of the screen in the displaying section may be defined as the reference axis.

The configurations described in the above described embodiments merely shows specific examples, and do not limit the scope of the technique of the current invention in any way. Any configuration may be applicable within the scope of the advantageous effect of the current invention.

INDUSTRIAL APPLICABILITY

The user interface device according to the current invention allows to easily change instrument operation functions appended to fingertips; and, other than an in-vehicle instrument, it is suitable for computer-related products and the like, which demand fine usability.

The invention claimed is:

1. A user interface device for operating an instrument, the user interface device comprising:
   a contact position acquiring section that detects a contact position of an operator on an operation surface;
   a hand shape acquiring section that acquires a hand shape of the operator;
   a hand shape direction acquiring section that acquires a direction of the hand shape based on the hand shape acquired by the hand shape acquiring section;
   a GUI (Graphical User Interface) button data storing section that stores GUI button data which represents GUI buttons each of which is uniquely allocated to a function for operating an instrument;
   a GUI button allocation section that allocates a GUI button allocated to a function, read out from the GUI button data storing section, to a fingertip in the hand shape acquired by the hand shape acquiring section, and reallocates, based only on a direction change of the hand shape, a different GUI button allocated to a different function to the fingertip in the hand shape;
   a superimposed image creating section that creates a composite image of an image of a GUI button allocated by the GUI button allocation section and an image of the hand shape; and
   a displaying section that displays the composite image created by the superimposed image creating section.

2. The user interface device according to claim 1, wherein the GUI button allocation section sequentially reallocates a different GUI button having a different function to the fingertip in the hand shape in accordance with a sequence for the fingertip, every time an angle between the direction of the hand shape acquired by the hand shape direction acquiring section and a vertical direction reference axis of the operation surface becomes larger than a predefined angle.

3. The user interface device according to claim 1, wherein the GUI button allocation section sequentially reallocates a different GUI button having a different function to the finger in the hand shape in accordance with a sequence for the fingertip, every time an angle between the direction of the hand shape acquired by the hand shape direction acquiring section and a reference axis indicating a direction of the hand shape at a time the contact position acquiring section has detected a contact by the operator to the operation surface becomes larger than a predefined angle.

* * * * *